(12) United States Patent
Mori et al.

(10) Patent No.: US 9,321,448 B2
(45) Date of Patent: Apr. 26, 2016

(54) VEHICLE DRIVE SYSTEM

(71) Applicant: Aisin Seiki Kabushiki Kaisha, Kariya-shi (JP)

(72) Inventors: Kyosuke Mori, Kariya (JP); Yasuhisa Iwasaki, Ichinomiya (JP); Yoshihiro Murakami, Chiryu (JP); Shinya Harada, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 75 days.

(21) Appl. No.: 14/184,859

(22) Filed: Feb. 20, 2014

(65) Prior Publication Data

US 2014/0235405 A1    Aug. 21, 2014

(30) Foreign Application Priority Data

Feb. 21, 2013    (JP) ................. 2013-032539

(51) Int. Cl.

| | |
|---|---|
| *B60W 10/11* | (2012.01) |
| *F16H 61/04* | (2006.01) |
| *F16H 63/50* | (2006.01) |
| *B60W 10/06* | (2006.01) |

(52) U.S. Cl.
CPC ............ *B60W 10/11* (2013.01); *B60W 10/06* (2013.01); *F16H 61/04* (2013.01); *F16H 63/502* (2013.01); *F16H 2306/44* (2013.01); *F16H 2306/46* (2013.01); *Y10T 477/6403* (2015.01)

(58) Field of Classification Search
None
See application file for complete search history.

(56) References Cited

U.S. PATENT DOCUMENTS

| | | | | |
|---|---|---|---|---|
| 6,319,167 | B1* | 11/2001 | Yoshida et al. ................. 477/5 |
| 2002/0189397 | A1* | 12/2002 | Sakamoto et al. ............. 74/661 |
| 2005/0126321 | A1* | 6/2005 | Ochi et al. ..................... 74/335 |
| 2010/0273604 | A1* | 10/2010 | Imaseki ........................... 477/5 |
| 2013/0079192 | A1* | 3/2013 | Terakawa et al. ................ 477/5 |
| 2013/0158770 | A1* | 6/2013 | Araki ............................. 701/22 |
| 2013/0325238 | A1* | 12/2013 | Kato et al. ..................... 701/22 |

FOREIGN PATENT DOCUMENTS

JP        2000-337494        12/2000

* cited by examiner

*Primary Examiner* — Ramya Burgess
*Assistant Examiner* — Timothy M Hannon
(74) *Attorney, Agent, or Firm* — Oblon, McClelland, Maier & Neustadt, L.L.P.

(57) ABSTRACT

A vehicle drive system includes a transmission, a clutch, and a shift execution portion. The shift execution portion operates the shift actuator to control the connecting portion in an engaged state engaged with the idler gear of a present gear stage to disengage from the idler gear of the present gear stage while gradually decreasing the engine torque while the clutch is still engaged, when a shift operation from the present gear stage to a subsequent gear stage is executed.

7 Claims, 12 Drawing Sheets

FIG. 2
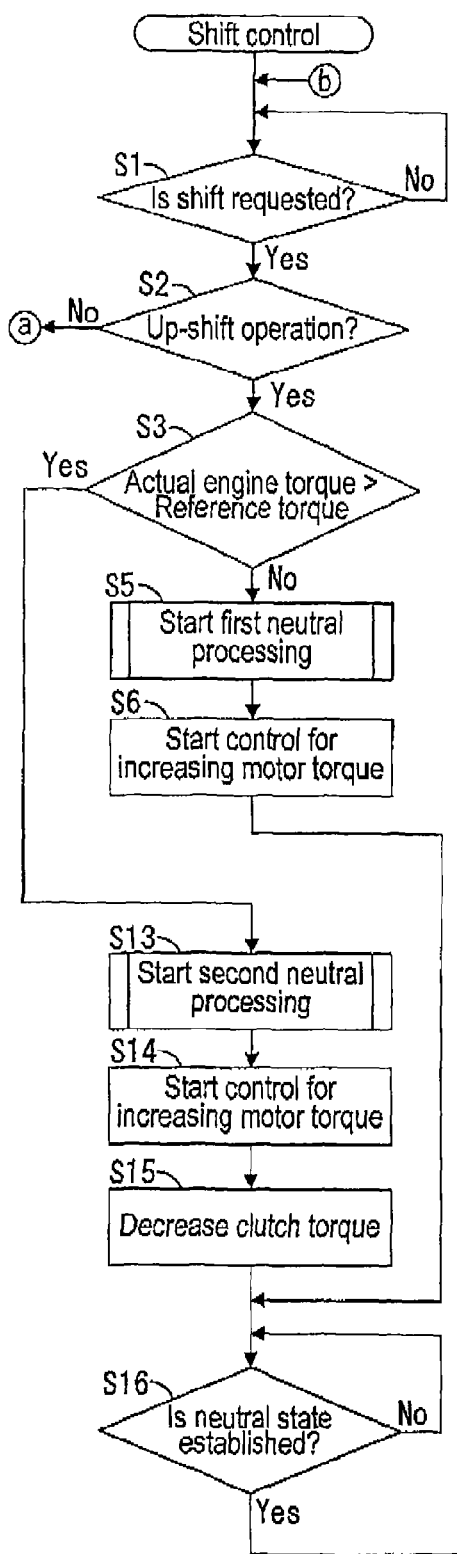
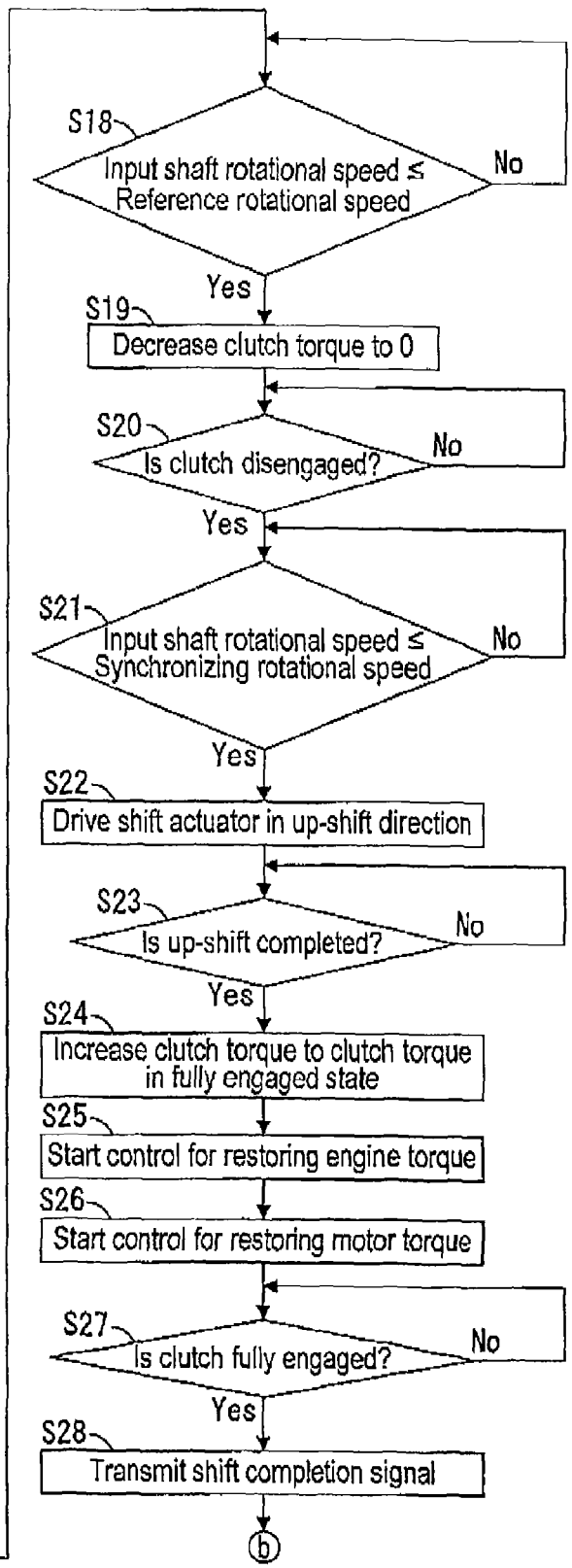

FIG. 3
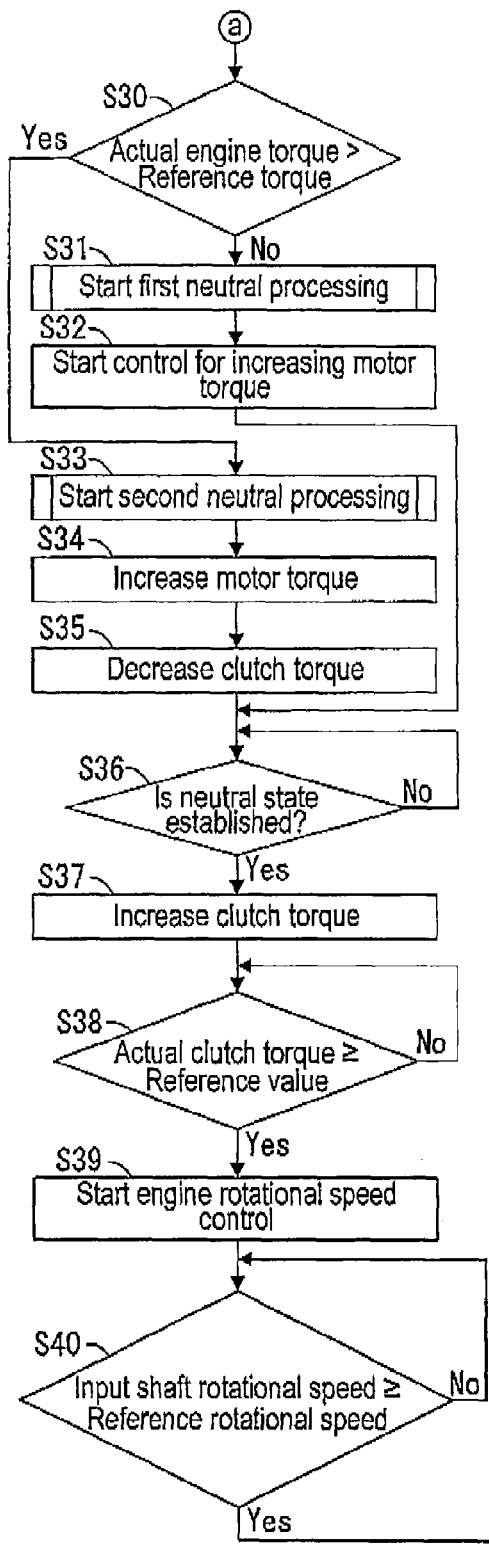
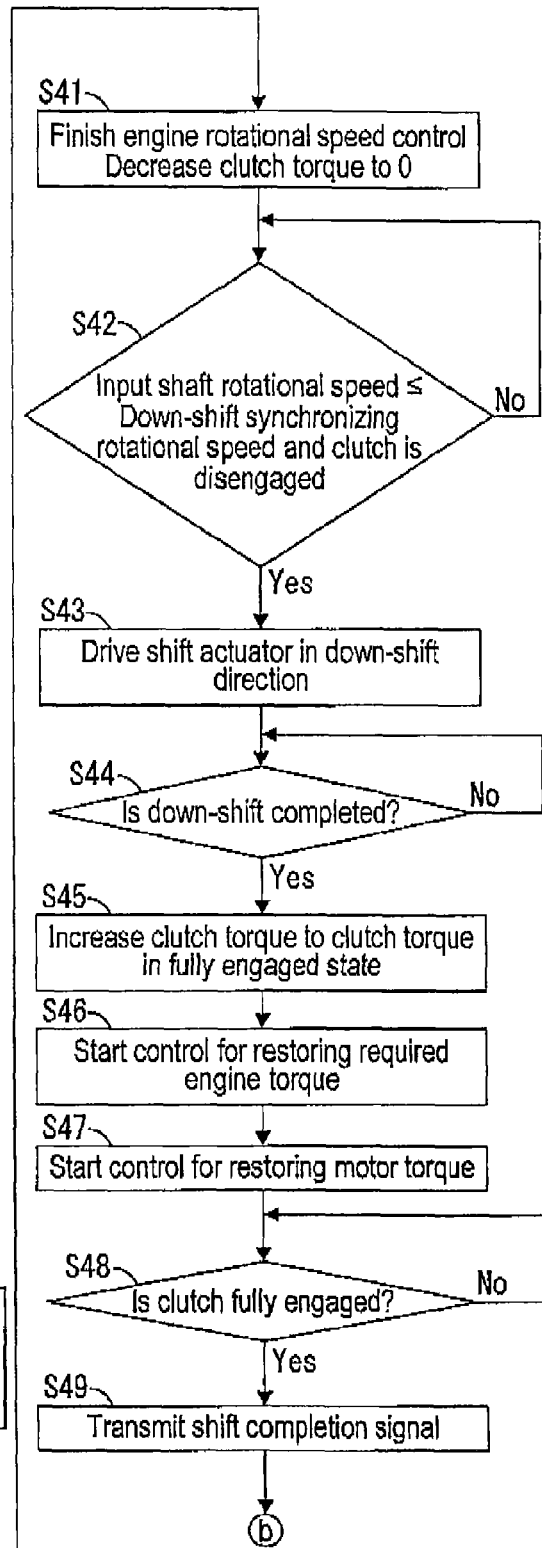

F I G. 10

| Gear stage | Learned torque (Nm) |
|---|---|
| 1st speed | 7.1 |
| 2nd speed | 10.5 |
| 3rd speed | 14.2 |
| 4th speed | 17.5 |
| 5th speed | 21.3 |

VEHICLE DRIVE SYSTEM

CROSS REFERENCE TO RELATED APPLICATIONS

This application is based on and claims priority under 35 U.S.C. §119 to Japanese Patent Application 2013-032539, filed on Feb. 21, 2013, the entire content of which is incorporated herein by reference.

TECHNICAL FIELD

This disclosure generally relates to a vehicle drive system.

BACKGROUND DISCUSSION

A known automated manual transmission (AMT), which includes a manual transmission as a basic component and is shifted by an actuator, is disclosed in JP2000-337494A, hereinafter referred to as Reference 1. The AMT disclosed in Reference 1 disengages a clutch before an operation for establishing a neutral state in a gear shift process to decrease a load in a rotational direction to zero at a portion where an idler gear and a shaft are fitted and then operates an actuator to release the idler gear from a state of being fitted to the shaft.

As described above, the AMT disclosed in Reference 1 disengages the clutch to establish the neutral state. As a result, a shift time becomes longer by a length of time for bringing the clutch into a disengaged state.

A need thus exists for a vehicle drive system, which is not susceptible to the drawbacks mentioned above.

SUMMARY

A vehicle drive system includes a transmission including an input shaft receiving an engine torque, an output shaft arranged in parallel with the input shaft, the output shaft configured to rotatably connect to a driving wheel, plural idler gears idly rotatably arranged at one of the input shaft and the output shaft, plural fixed gears fixed to the other of the input shaft and the output shaft so as not to relatively rotate, the plural fixed gears being engageable with the plural idler gears, respectively, a connecting portion provided at a shaft at which the plural idler gears are arranged, and positioned side by side with the plural idler gears so as not to rotate relative to the shaft and so as to move in an axial direction of the shaft, the connecting portion for rotatably connecting the idler gear and the shaft so as to restrain the idler gear and the shaft from rotating relative to each other, and a shift actuator moving the connecting portion in the axial direction to engage the connecting portion with the idler gear that corresponds to the connecting portion so as not to relatively rotate, the shift actuator moving the connecting portion in the axial direction to be disengaged from the idler gear that corresponds to the connecting portion so as to relatively rotate. The vehicle drive system further includes a clutch configured to be arranged between a drive shaft receiving the engine torque and the input shaft, the clutch selectively connecting the drive shaft and the input shaft. The vehicle drive system furthermore includes a shift execution portion operating the shift actuator to control the connecting portion in an engaged state engaged with the idler gear of a present gear stage to disengage from the idler gear of the present gear stage while gradually decreasing the engine torque while the clutch is still engaged, when a shift operation from the present gear stage to a subsequent gear stage is executed.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a flowchart of a shift control routine as a control program to be executed by a TM-ECU illustrated in FIG. 1;

FIG. 3 is a flowchart of a shift control routine as a control program to be executed by the TM-ECU illustrated in FIG. 1;

FIG. 10 is an explanatory drawing illustrating memorized data for learned torques including the learned torques for different gear stages, which are memorized;

DETAILED DESCRIPTION

A configuration of a vehicle drive system 100 according to an embodiment will be described as follows with reference to the attached drawings. A hybrid vehicle (which will be hereinafter referred to as a vehicle) in which the vehicle drive system 100 according to the embodiment is mounted is a vehicle in which driving wheels Wl, Wr are driven by a torque outputted from an engine EG and a torque outputted from a motor generator MG.

Figure 1:
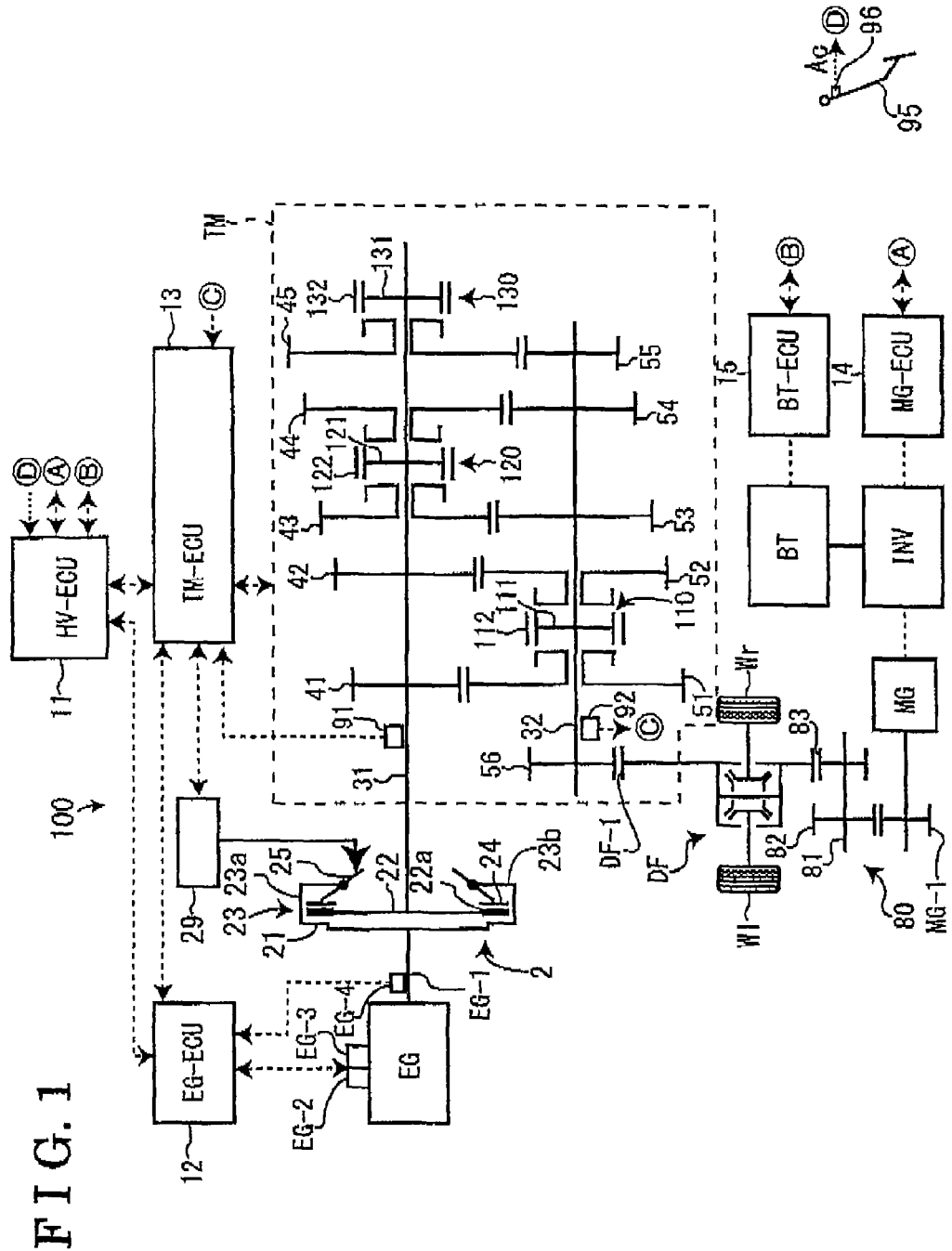
FIG. 1 is an explanatory drawing illustrating a vehicle drive system according to an embodiment disclosed here and a vehicle in which the vehicle drive system is mounted.

As illustrated in FIG. 1, the vehicle drive system 100 includes the engine EG, the motor generator MG, a clutch 2, a transmission TM, an inverter INV, a battery BT, a hybrid ECU 11 (indicated as HV-ECU), an engine ECU 12 (indicated as EG-ECU), a transmission ECU 13 (indicated as TM-ECU) serving as a shift execution device, a motor generator ECU 14 (indicated as MG-ECU), a battery ECU 15 (indicated as BT-ECU), a speed reducer 80, and an accelerator pedal 95. In the embodiment, the HV-ECU 11, the EG-ECU 12, and the TM-ECU 13 are described as separate members. Alternatively, the HV-ECU 11, the EG-ECU 12, the TM-ECU 13, MG-ECU 14, and the BT-ECU15 may be an integrated member.

The engine EG is, for example, a gasoline engine, a diesel engine, or the like which utilizes hydrocarbon fuel, for example, gasoline or light oil. The engine EG outputs the torque. The engine EG includes a drive shaft EG-1, a fuel injection device EG-2, and a throttle valve EG-3.

The fuel injection device EG-2 and the throttle valve EG-3 are connected to the EG-ECU 12 so as to communicate therewith, thereby being controlled by the EG-ECU 12. An engine rotational speed sensor EG-4 is provided adjacent to the drive shaft EG-1. The engine rotational speed sensor EG-4 detects the rotational speed of the drive shaft EG-1, i.e., an engine rotational speed Ne. The engine rotational sensor EG-4 is connected to the EG-ECU 12 so as to communicate therewith and outputs a detected result of the engine rotational speed Ne to the EG-ECU 12.

The drive shaft EG-1 integrally rotates with a crankshaft, which is driven to rotate by pistons. The engine EG outputs an engine torque Te, which is a torque outputted from the engine EG, to the drive shaft EG-1 and drives the driving wheels Wl, Wr. In a case where the engine EG is a gasoline engine, the engine EG includes an ignition device for igniting an air-fuel mixture in a cylinder. The ignition device is positioned at a cylinder head of the engine EG.

The throttle valve EG-3 is positioned at an intermediate position on a path for taking in air into the cylinder of the engine EG. The throttle valve EG-3 adjusts an amount of air for use in an air-fuel mixture to be taken into the cylinder of the engine EG. The fuel injection device EG-2 is positioned, for example, at an intermediate position on a path for taking in air into the engine EG and on a cylinder head of the engine EG. The fuel injection device EG-2 is a device that injects fuel, for example, gasoline and light oil.

The accelerator pedal 95 variably controls a driving force outputted from the vehicle drive system 100. The accelerator pedal 95 is provided with an acceleration sensor 96 for detecting an accelerator position Ac, which represents an amount the accelerator pedal 95 is operated. The acceleration sensor 96 is connected to the HV-ECU 11 so as to communicate therewith.

The clutch 2 is arranged between the drive shaft EG-1 and an input shaft 31 of the transmission TM. The clutch 2 is configured to connect and disconnect between the drive shaft EG-1 and the input shaft 31 and is a clutch of a selected type that may electronically control the clutch torque Tc being transmitted between the drive shaft EG-1 and the input shaft 31. In the embodiment, the clutch 2 is a single dry clutch which is normally closed. The clutch 2 includes a flywheel 21, a clutch disc 22, a clutch cover 23, a pressure plate 24, and a diaphragm spring 25.

The flywheel 21 is formed in an annular plate having a predetermined mass. The flywheel 21 to which the drive shaft EG-1 is connected integrally rotates with the drive shaft EG-1. The clutch disc 22 is formed in an annular plate and a friction member 22*a* is provided at a radially outward edge portion of the clutch disc 22. The clutch disc 22 faces the flywheel 21 so as to come close to and separate from the flywheel 21. The clutch disc 22 is connected to the input shaft 31 so as to integrally rotate therewith.

The clutch cover 23 is configured by a cylindrical portion 23*a* connected to a radially outward edge of the flywheel 21 and arranged at a radially outward side of the clutch disc 22, and a side circumferential wall 23*b* extending radially inward from an end potion of the cylindrical portion 23*a*. The end portion of the cylindrical portion 23*a* is at an opposite side of a connected portion of the cylindrical portion 23*a* to the flywheel 21 as seen from the engine EG. The clutch disc 22 includes a first surface facing the flywheel 21 and a second surface opposite of the first surface from the flywheel 21. The pressure plate 24 formed in an annular flat plate is provided to face the second surface of the clutch disc 22 so as to come close to and separate from the second surface.

The diaphragm spring 25 is a so-called disc spring. A diaphragm is formed at the diaphragm spring 25 so as to be inclined in a thickness direction thereof. An intermediate portion of the diaphragm spring 25 in a radial direction thereof is in contact with a radially inward end of the side circumferential wall 23*b* of the clutch cover 23 while a radially outward end of the diaphragm spring 25 is in contact with the pressure plate 24. The diaphragm spring 25 presses the clutch disc 22 via the pressure plate 24 to the flywheel 21. In a state where the diaphragm spring 25 presses the clutch disc 22 via the pressure plate 24 to the flywheel 21, the friction member 22*a* of the clutch disc 22 is pressed by the flywheel 21 and the pressure plate 24; therefore, the clutch disc 22 and the flywheel 21 integrally rotate with each other by a frictional force between the friction member 22*a* and the flywheel 21 and by a frictional force between the friction member 22*a* and the pressure plate 24. As a result, the drive shaft EG-1 is connected to the input shaft 31.

A clutch actuator 29 is provided at the vehicle drive system 100 according to the embodiment. Driving of the clutch actuator 29 is controlled by the TM-ECU 13; thereby, a radially inward end portion of the diaphragm spring 25 is pressed toward the flywheel 21 or is released from the pressed condition thereof. Therefore, a clutch torque Tc is varied. The clutch actuator 29 includes, for example, an electric clutch actuator and a hydraulic clutch actuator. The clutch actuator 29 presses the radially inward end portion of the diaphragm spring 25 toward the flywheel 21; therefore, the diaphragm spring 25 is deformed in a manner that the radially outward end thereof is shifted in a direction to separate from the flywheel 21. In accordance with the deformation of the diaphragm spring 25, a pressing force by which the flywheel 21 and the pressure plate 24 press the clutch disc 22 gradually decreases and the clutch torque Tc between the clutch disc 22 and the flywheel 21 also gradually decreases; therefore, the drive shaft EG-1 is disconnected from the input shaft 31. As described above, the TM-ECU 13 drives the clutch actuator 29 to vary the clutch torque Tc between the clutch disc 22 and the flywheel 21 to be at a selected torque.

The transmission TM is a transmission which is configured by a gear mechanism to change the torque outputted from the engine EG by gear ratios of plural gear stages to output the torque to a differential mechanism DF. The transmission TM of the embodiment is a dog-clutch type transmission, which is provided with a first sleeve 112, a second sleeve 122, and a third sleeve 132, but not provided with a synchronization mechanism, for example, a synchronizer ring. Each of the first sleeve 112, the second sleeve 122, and the third sleeve 132, serves as the connecting portion and may be referred to as the sleeve in this disclosure.

The transmission TM includes the input shaft 31, an output shaft 32, a first drive gear 41, a second drive gear 42, a third drive gear 43, a fourth drive gear 44, a fifth drive gear 45, a first driven gear 51, a second driven gear 52, a third driven gear 53, a fourth driven gear 54, a fifth driven gear 55, an output gear 56, a first selection mechanism 110, a second selection mechanism 120, and a third selection mechanism 130. Each of the input shaft 31 and the output shaft 32 serves as the shaft. Each of the input shaft 31 and the output shaft 32 may be referred to as the shaft in this disclosure.

The input shaft 31 is a shaft to which the torque outputted from the engine EG is inputted. The input shaft 31 integrally rotates with the clutch disc 22 of the clutch 2. The output shaft 32 is arranged in parallel with the input shaft 31. The input shaft 31 and the output shaft 32 are housed in a housing of the transmission TM and are rotatably supported by the housing.

The first drive gear 41 and the second drive gear 42 are fixed gears, which are fixed to the input shaft 31 so as not to rotate relative thereto. The third drive gear 43, the fourth drive gear 44, and the fifth drive gear 45 are idler gears, which are provided at the input shaft 31 so as to idly rotate relative to the input shaft 31.

The first driven gear 51 and the second driven gear 52 are idler gears, which are provided at the output shaft 32 so as to idly rotate relative to the output shaft 32. The third driven gear 53, the fourth driven gear 54, the fifth driven gear 55, and the output gear 56 are fixed gears which are fixed to the output shaft 32 so as not to rotate relative thereto. Each of the first driven gear 51, the second driven gear 52, the third drive gear 43, the fourth drive gear 44, and the fifth drive gear 45 serves as the idler gear. Each of the first driven gear 51, the second driven gear 52, the third drive gear 43, the fourth drive gear 44, and the fifth drive gear 45 may be referred to as the idler gear in this disclosure. Each of the first drive gear 41, the second drive gear 42, the third driven gear 53, the fourth driven gear 54, the fifth driven gear 55 serves as the fixed gear.

The first drive gear 41 and the first driven gear 51 engage with each other to configure, or establish, a first gear stage. The second drive gear 42 and the second driven gear 52 engage with each other to configure, or establish, a second gear stage. The third drive gear 43 and the third driven gear 53 engage with each other to configure, or establish, a third gear stage. The fourth drive gear 44 and the fourth driven gear 54 engage with each other to configure, or establish, a fourth gear stage. The fifth drive gear 45 and the fifth driven gear 55 engage with each other to configure, or establish, a fifth gear stage.

Gear diameters of the first drive gear 41, the second drive gear 42, the third drive gear 43, the fourth drive gear 44, and the fifth drive gear 45 are designed to gradually increase in the mentioned order. Gear diameters of the first driven gear 51, the second driven gear 52, the third driven gear 53, the fourth driven gear 54, and the fifth driven gear 55 are designed to gradually decrease in the mentioned order.

An input shaft rotational speed sensor 91 for detecting a rotational speed of the input shaft 31 is provided adjacent to the input shaft 31 or adjacent to the first drive gear 41 or the second drive gear 42. An output shaft rotational speed sensor 92 for detecting a rotational speed of the output shaft 32 is provided adjacent to the output shaft 32 or adjacent to the third driven gear 53, the fourth driven gear 54, or the fifth driven gear 55. The input shaft rotational speed sensor 91 and the output shaft rotational speed sensor 92 are connected to the TM-ECU 13 so as to communicate therewith and output detection signals to the TM-ECU 13.

The output shaft 32 outputs the torque inputted to the transmission TM to the differential mechanism DF. When the output gear 56 is engaged with a ring gear DF-1 of the differential mechanism DF, the torque inputted to the output shaft 32 is outputted to the differential mechanism DF.

Figure 7:
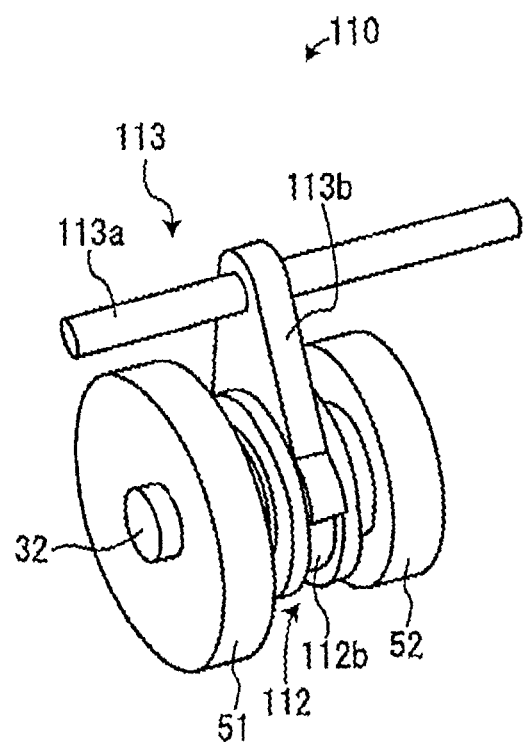
FIG. 7 is a perspective view drawing illustrating a first selection mechanism.
Figure 8:
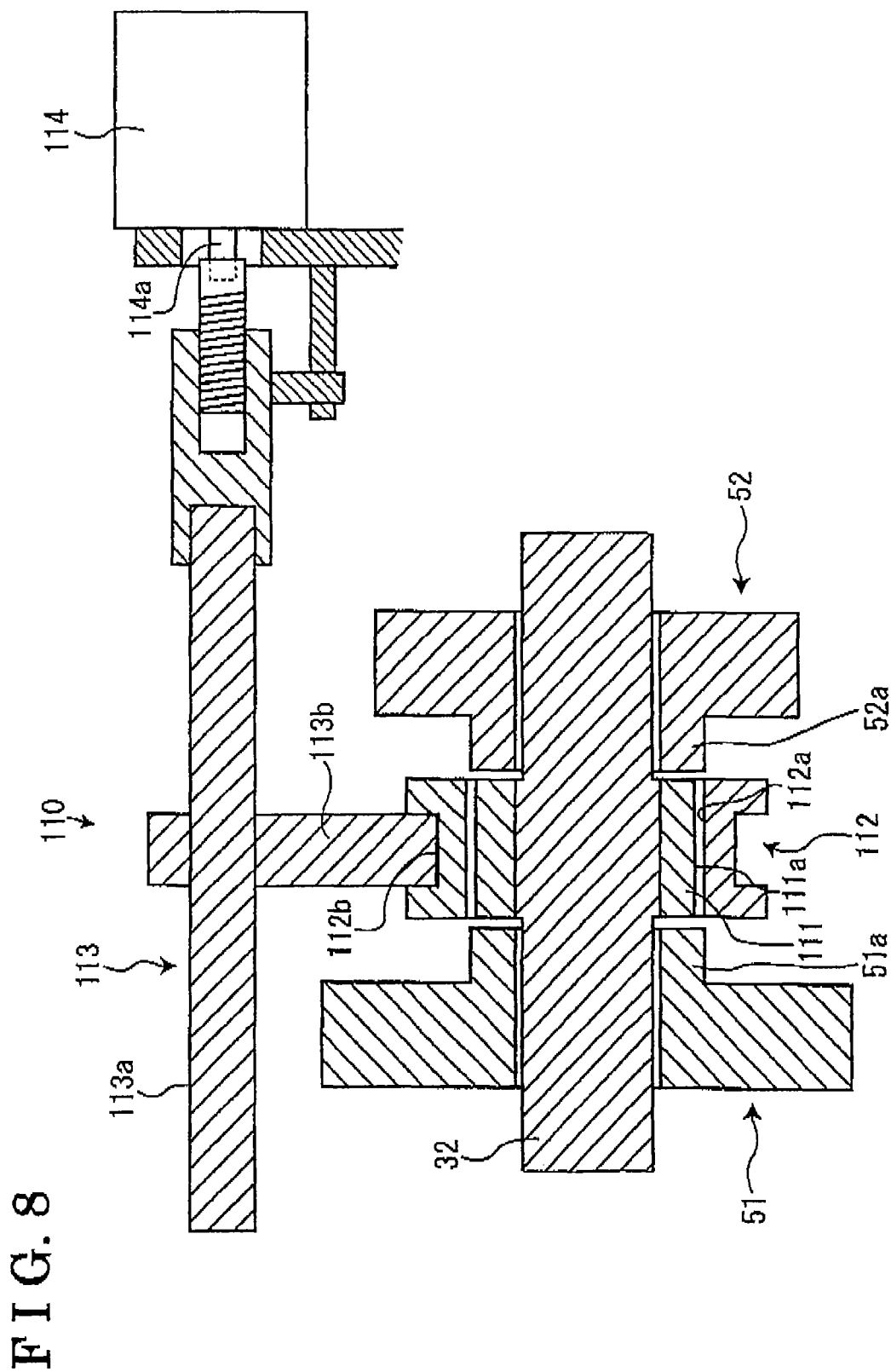
FIG. 8 is a cross-sectional view drawing illustrating the first selection mechanism.

The first selection mechanism 110 selects one of the first driven gear 51 and the second driven gear 52 to connect the selected one of the first driven gear 51 and the second driven gear 52 to the output shaft 32 in a manner that the selected one of the first driven gear 51 and the second driven gear 52 may not rotate relative to the output shaft 32. The first selection mechanism 110 is arranged between the first driven gear 51 and the second driven gear 52. As FIGS. 7 and 8 illustrate, the first selection mechanism 110 includes a first hub 111, a first sleeve 112 a first fork member 113 and a first shift actuator 114. The first shift actuator 114, serves as the shift actuator. A second shift actuator and a third shift actuator will be described later in this disclosure. Each of the first shift actuator 114, the second shift actuator and the third shift actuator may be referred to as the shift actuator in this disclosure. A second hub 121 and a third hub 131 will be described later in this disclosure. Each of the first hub 111, the second hub 121, and the third hub 131 may be referred to as the hub in this disclosure.

Figure 9:
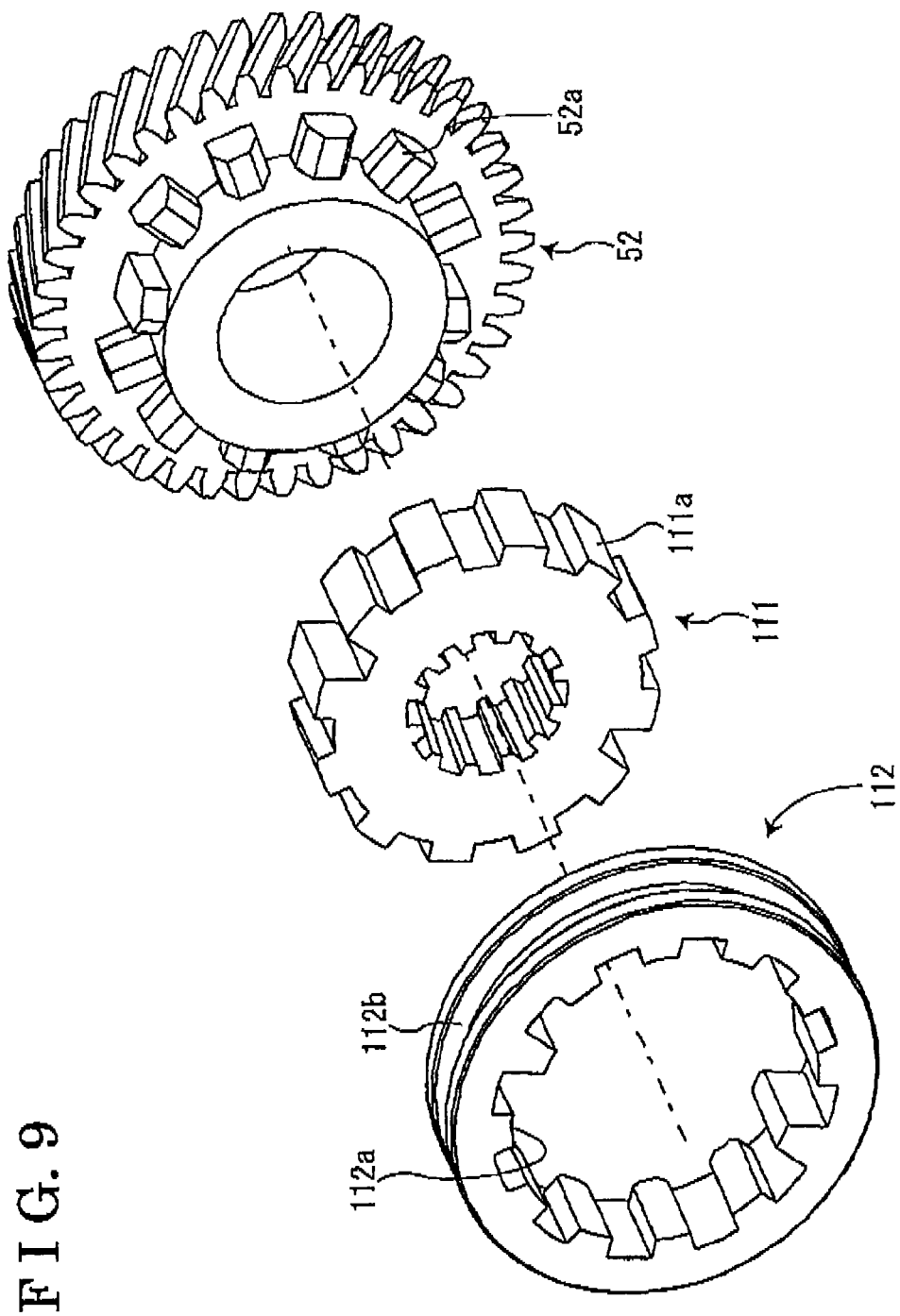
FIG. 9 is a perspective view drawing illustrating a first hub and a first sleeve included in the first selection mechanism.

The first hub 111, which is positioned at a position between the first driven gear 51 and the second driven gear 52, is fixed to the output shaft 32 so as not to rotate relative thereto. As FIG. 9 illustrates, outer teeth 111a are formed on the outer peripheral portion of the first hub 111. The first sleeve 112 is formed in an annular form. Inner teeth 112a are formed on the inner peripheral portion of the first sleeve 112. The outer teeth 111a and the inner teeth 112a are arranged to fit to each other so as to restrain the first sleeve 112 from rotating relative to the first hub 111 and so as to move the first sleeve 112 relative to the first hub 111 in the axial direction of the output shaft 32.

As FIG. 8 illustrates, dog teeth 51a are formed on a side surface of the first driven gear 51, the side surface facing the first hub 111. As FIGS. 8 and 9 illustrate, dog teeth 52a are formed on a side surface of the second driven gear 52, the side surface facing the first hub 111.

When the first sleeve 112 moves toward the first driven gear 51, the inner teeth 112a and the dog teeth 51a fit to each other so that the first driven gear 51 connects to the output shaft 32 so as not to rotate relative to the output shaft 32.

As FIGS. 7 and 8 illustrate, the first fork member 113 includes a shaft 113a and a fork 113b. The fork 113b is engaged with an engagement portion 112b formed as a recessed area on the outer peripheral portion of the first sleeve 112.

The first shift actuator 114 is a servo motor for moving the first sleeve 112 toward the first driven gear 51 or toward the second driven gear 52 and for moving the first sleeve 112 to a first neutral position that is positioned at an intermediate position between the first driven gear 51 and the second driven gear 52 via the first fork member 113. In the embodiment, a rotary shaft 114a or a member that connects to the rotary shaft 114a is threadably mounted to the shaft 113a or a member connected to the shaft 113a. When the rotary shaft 114a rotates, the shaft 113a moves in the axial direction. The first shift actuator 114 is controlled and driven by the TM-ECU 13.

When the first shift actuator 114 moves the first sleeve 112 to the first driven gear 51, the first driven gear 51 connects to the output shaft 32 via the first sleeve 112 so as not to rotate relative to the output shaft 32 so that the first gear stage is established. When the first shift actuator 114 moves the first sleeve 112 to the second driven gear 52, the second driven gear 52 connects to the output shaft 32 via the first sleeve 112 so as not to rotate relative to the output shaft 32 so that the second gear stage is established. When the first shift actuator 114 moves the first sleeve 112 to the first neutral position, each of the first driven gear 51 and the second driven gear 52 is brought into a neutral state where the first driven gear 51 and the second driven gear 52 are rotatable relative to the output shaft 32.

The second selection mechanism 120 selects one of the third drive gear 43 and the fourth drive gear 44 to connect the selected one of the third drive gear 43 and the fourth drive gear 44 to the input shaft 31 in a manner that the selected one of the third drive gear 43 and the fourth drive gear 44 may not rotate relative to the input shaft 31. The second selection mechanism 120 is structurally similar to the above described first selection mechanism 110. The second selection mechanism 120 includes a second hub 121, a second sleeve 122, a second fork member, and the second shift actuator. The second shift actuator serves as the shift actuator.

The second hub 121, which is positioned at a position between the third drive gear 43 and the fourth drive gear 44, is fixed to the input shaft 31 so as not to rotate relative thereto. In other words, the second hub 121 is arranged adjacent to, or positioned side by side with, the third drive gear 43 and the fourth drive gear 44.

The second sleeve 122 is arranged so as not to rotate relative to the second hub 121 and arranged so as to move in the axial direction of the input shaft 31. The second sleeve 122 selectively engages with the third drive gear 43 and with the fourth drive gear 44.

The second shift actuator is controlled and driven by the TM-ECU 13 to thereby move the second sleeve 122 via the second fork member toward the third drive gear 43 or the fourth drive gear 44. In addition, the second shift actuator moves the second sleeve 122 to a second neutral position which is positioned at an intermediate position between the third drive gear 43 and the fourth drive gear 44. In a case where the second shift actuator moves the second sleeve 122 to the third drive gear 43, the third drive gear 43 is connected via the second sleeve 122 to the input shaft 31 so as not to rotate relative thereto, so that the third gear stage is established. In a case where the second shift actuator moves the second sleeve 122 to the fourth drive gear 44, the fourth drive gear 44 is connected via the second sleeve 122 to the input shaft 31 so as not to rotate relative thereto, so that the fourth gear stage is established. In a case where the second shift actuator moves the second sleeve 122 to the second neutral position, each of the third drive gear 43 and the fourth drive gear 44 are brought into a neutral state where the third drive gear 43 and the fourth drive gear 44 are rotatable relative to the input shaft 31.

The third selection mechanism 130 selects the fifth drive gear 45 to connect the fifth drive gear 45 to the input shaft 31 in a manner that the fifth drive gear 45 may not rotate relative to the input shaft 31. The third selection mechanism 130 is structurally similar to the above described first selection mechanism 110. The third selection mechanism 130 includes a third hub 131, a third sleeve 132, a third fork member, and the third shift actuator. The third shift actuator serves as the shift actuator.

The third hub 131, which is positioned adjacent to the fifth drive gear 45, is fixed to the input shaft 31 so as not to rotate relative thereto. The third sleeve 132 is arranged so as not to rotate relative to the third hub 131 and arranged so as to move in the axial direction of the input shaft 31. The third sleeve 132 selectively engages with the fifth drive gear 45.

The third shift actuator is controlled and driven by the TM-ECU 13 to thereby move the third sleeve 132 toward the fifth drive gear 45 via the third fork member. In addition, the third shift actuator is driven and controlled by the TM-ECU 13 to thereby move the third sleeve 132 to a third neutral position which is located away from the fifth drive gear 46. In a case where the third shift actuator moves the third sleeve 132 to the fifth drive gear 45, the fifth drive gear 45 is connected via the third sleeve 132 to the input shaft 31 so as not to rotate relative thereto, thereby establishing the fifth gear stage. In a case where the third shift actuator moves the third sleeve 132 to the third neutral position, the fifth drive gear 45 is brought into a neutral state where the fifth drive gear 45 is rotatable relative to the input shaft 31.

The differential mechanism DF transmits the torque inputted from at least one of the output shaft 32 of the transmission TM and the motor generator MG to the driving wheels Wl, Wr to allow the driving wheels Wl, Wr to rotate at different speeds. The differential mechanism DF includes the ring gear DF-1 engageable with the output gear 56 and a drive gear 83. According to the configuration of the differential mechanism DF, the output shaft 32 rotatably connects to the driving wheels Wl, Wr.

The speed reducer 80 reduces the torque of the motor generator MG to output the reduced torque to the differential mechanism DF. The speed reducer 80 includes a rotary shaft 81, a driven gear 82, and the drive gear 83. The driven gear 82 and the drive gear 83 are attached to the rotary shaft 81. The rotary shaft 81 is rotatably supported by a housing to be rotatable. The driven gear 82 is engageable with a drive gear MG-1, which rotates by the motor generator MG. A gear diameter of the driven gear 82 is greater than a gear diameter of the drive gear 83. The drive gear 83 is engageable with the ring gear DF-1 of the differential mechanism DF.

The motor generator MG operates as a motor for applying the torque to the driving wheels Wl, Wr and, in addition, serves as a power generator converting a motional energy of the vehicle into electricity. The motor generator MG is configured by a stator fixed to a case and by a rotor rotatably arranged at a radially inward side of the stator.

The inverter INV is electrically connected to the battery BT and to the stator of the motor generator MG. In addition, the inverter INV is connected to the MG-ECU 14 so as to communicate therewith. The inverter INV boosts a direct current supplied from the battery BT, in accordance with a control signal from the MG-ECU 14, and converts the direct current into an alternating current, thereafter supplying the alternating current to the stator. Therefore, the torque is generated by the motor generator MG and thus the motor generator MG functions as the motor. Further, in accordance with a control signal from the MG-ECU 14, the inverter INV allows the motor generator MG to function as the power generator. The inverter INV converts the alternating current generated by the motor generator MG into a direct current and reduces voltage to charge the battery BT.

The battery BT is a secondary battery that is chargeable. The battery BT is connected to the inverter INV. The battery BT is connected to the BT-ECU 15 so as to communicate therewith.

The HV-ECU 11 calculates a required driving force, which is required by a driver, in accordance with the accelerator position Ac detected by the acceleration sensor 96, which is based on an operation of the accelerator pedal 95 by the driver. The HV-ECU 11 calculates a required motor torque and a required engine torque Ter based on the required driving force.

The EG-ECU 12 is an electronic control unit to control the engine EG. The TM-ECU 13 is an electronic control unit to control the transmission TM. The TM-ECU 13 is provided with a memory portion, for example, an input/output interface, a CPU, a RAM, a ROM, and a non-volatile memory, and the like, which are connected via buses to one another. The CPU executes control programs corresponding to flow charts illustrated in FIGS. 2 to 4. The RAM temporarily stores variables required to execute the control programs. The memory portion stores, or memorizes, the control programs and memorized data for learned torques, which is illustrated in FIG. 10. The TM-ECU 13 may detect a stroke at the first sleeve 112, at the second sleeve 122, and at the third sleeve 132, which is respectively at the first fork member 113, at the second fork member, and at the third fork member, in accordance with a detection signal respectively from the first shift actuator 114, from the second shift actuator, and from the third shift actuator.

The EG-ECU 12 adjusts a throttle position of the throttle valve EG-3 based on the required engine torque Ter to adjusts an intake air amount and, in addition, adjusts the fuel injection amount from the fuel injection device EG-2 to control the ignition device.

Accordingly, the supply amount of the air-fuel mixture containing the fuel is adjusted and the engine torque Te outputted from the engine EG is adjusted to be at the required engine torque Ter, so that the engine rotational speed Ne is adjusted. In a case where the accelerator pedal 95 is not pressed, which is a state where the accelerator position Ac equals to zero, the engine rotational speed Ne is maintained at an idling rotational speed, for example, at 700 r.p.m.

The EG-ECU 12 calculates the engine torque Te the engine EG is actually outputting based on the engine rotational speed Ne detected by the engine rotational speed sensor EG-4, an intake air temperature from an intake air temperature sensor, an intake air pressure from an intake air pressure sensor, an intake air flow amount from an intake air flow amount sensor, and an amount of fuel injection the fuel injection device EG-2 is injecting.

The MG-ECU 14 is an electronic control unit to control the inverter INV. The BT-ECU 15 is an electronic control unit to manage states of the battery BT, for example, charged and discharged states and temperature states. The HV-ECU 11 is a superior electronic control unit to integrally control moving states of the vehicle. The HV-ECU 11, the EG-ECU 12, the TM-ECU 13, the MG-ECU 14, and the BT-ECU 15 may be communicated with one another via a controller area network (CAN).

Next, shift processing routines (i.e., the control programs) to be executed by the TM-ECU 13 will be described as follows with reference to the flowcharts of FIGS. 2 and 3 and timeline charts of FIGS. 5 and 6. When the vehicle is brought in a movable state and in a case where the TM-ECU 13 determines in step S1 that the TM-ECU 13 has received a shift request from the HV-ECU 11 (YES in step S1), the control program shifts from step S1 to step S2. In a case where the TM-ECU 13 determines in step S1 that the TM-ECU 13 has not received a shift request from the HV-ECU 11 (NO in step S1), a processing of step S1 is repeated.

The HV-ECU 11 outputs the shift request to the TM-ECU 13 in a case where the HV-ECU 11 determines that a moving state of the vehicle, which is configured by the throttle position and by a speed of the vehicle, has been beyond a shift line indicating a relation between the throttle position and the speed, or in a case where the driver of the vehicle operates a shift lever. After the TM-ECU 13 receives the shift request, an authority for controlling the engine EG shifts from the HV-ECU 11 to the TM-ECU 13 and an authority for controlling the motor generator MG shifts from the MG-ECU 14 to the TM-ECU 13.

In a case where the shift request received by the TM-ECU 13 is determined as an up-shift operation in step S2 (YES in step S2, at time T1 in FIG. 5), the control program shifts from step S2 to step S3. In a case where the shift request received by the TM-ECU 13 is determined as a down-shift operation in step S2 (NO in step S2, at time T1 in FIG. 6), the control program shifts from step S2 to step S30.

In step S3, in a case where the TM-ECU 13 determines that the engine torque Te the engine EG is actually outputting is greater than the reference torque Ter1 (YES in step S3), the control program shifts from step S3 to step S13. In a case where the TM-ECU 13 determines that the engine torque Te the engine EG is actually outputting is equal to or smaller than the reference torque Ter1 (No in step S3), the control program shifts from step S3 to step S5. The reference torque Ter1 is the torque calculated at the step S101 in FIG. 4. The reference torque Ter1 will be described in detail later.

Figure 12:
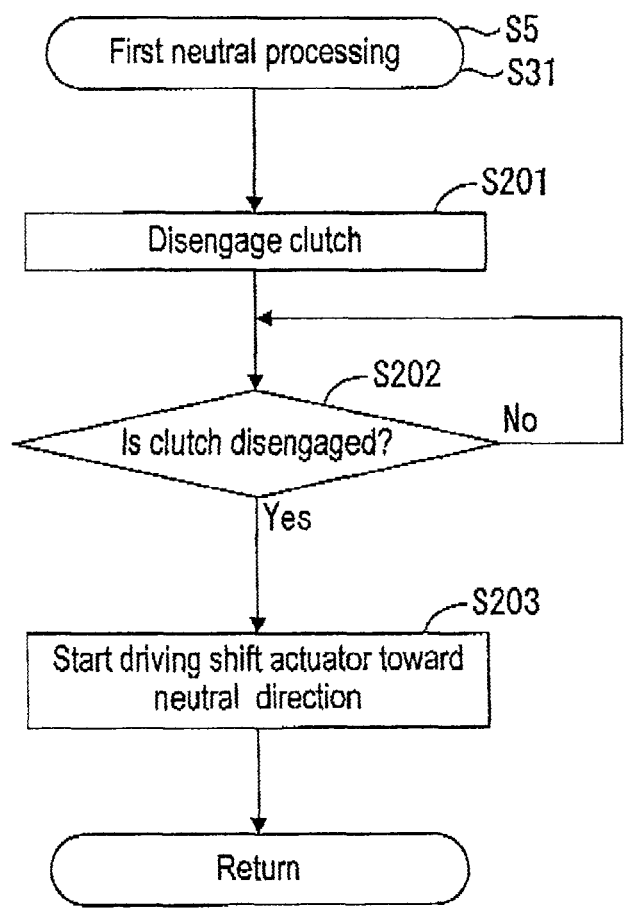
FIG. 12 is a flowchart of a first neutral processing routine, which is a control program to be executed by the TM-ECU illustrated in FIG. 1.

In step S5, the TM-ECU 13 executes a first neutral processing. When the first neutral processing starts, the control program shifts to step S201 in FIG. 12. In step S201, the TM-ECU 13 drives the clutch actuator 29 to bring the clutch torque Tc to zero to start a process to disengage the clutch 2. When step S201 ends, the control program shifts to step S202.

In step S202, in a case where the TM-ECU 13 determines that the clutch 2 is in a disengaged state by the clutch torque becoming zero based on the determination signal form the clutch actuator 29 (YES in step S202), the control program shifts to step S203. In a case where the TM-ECU 13 determines that the clutch 2 is not in the disengaged state (NO in step S202), a processing of step S202 is repeated.

In the first neutral processing, in step S203, the TM-ECU 13 outputs a control signal to the shift actuator (the first shift actuator 114, the second shift actuator, the third shift actuator) to drive the shift actuator so that the sleeve (the first sleeve 112, the second sleeve 122, the third sleeve 132) starts moving to the neutral position corresponding to the sleeve. When the step S203 ends, the first neutral processing ends.

In step S6, which is simultaneously executed with step S5, the TM-ECU 13 outputs a control signal to the MG-ECU 14 to start control for increasing the motor torque Tm, which is outputted by the motor generator MG. The motor torque Tm is controlled such that the motor torque Tm compensate for the amount of reduction of the engine torque Te to be inputted to the ring gear DF-1 of the differential mechanism DF. When the step S6 ends, the control program shifts to step S16.

In step 313, the TM-ECU 13 starts executing the second neutral processing. The second neutral processing is a process to bring the transmission TM to a neutral state while decreasing the engine torque Te. The second neutral processing will be described in detail later with reference to the flowchart illustrated in FIG. 4.

Figure 5:
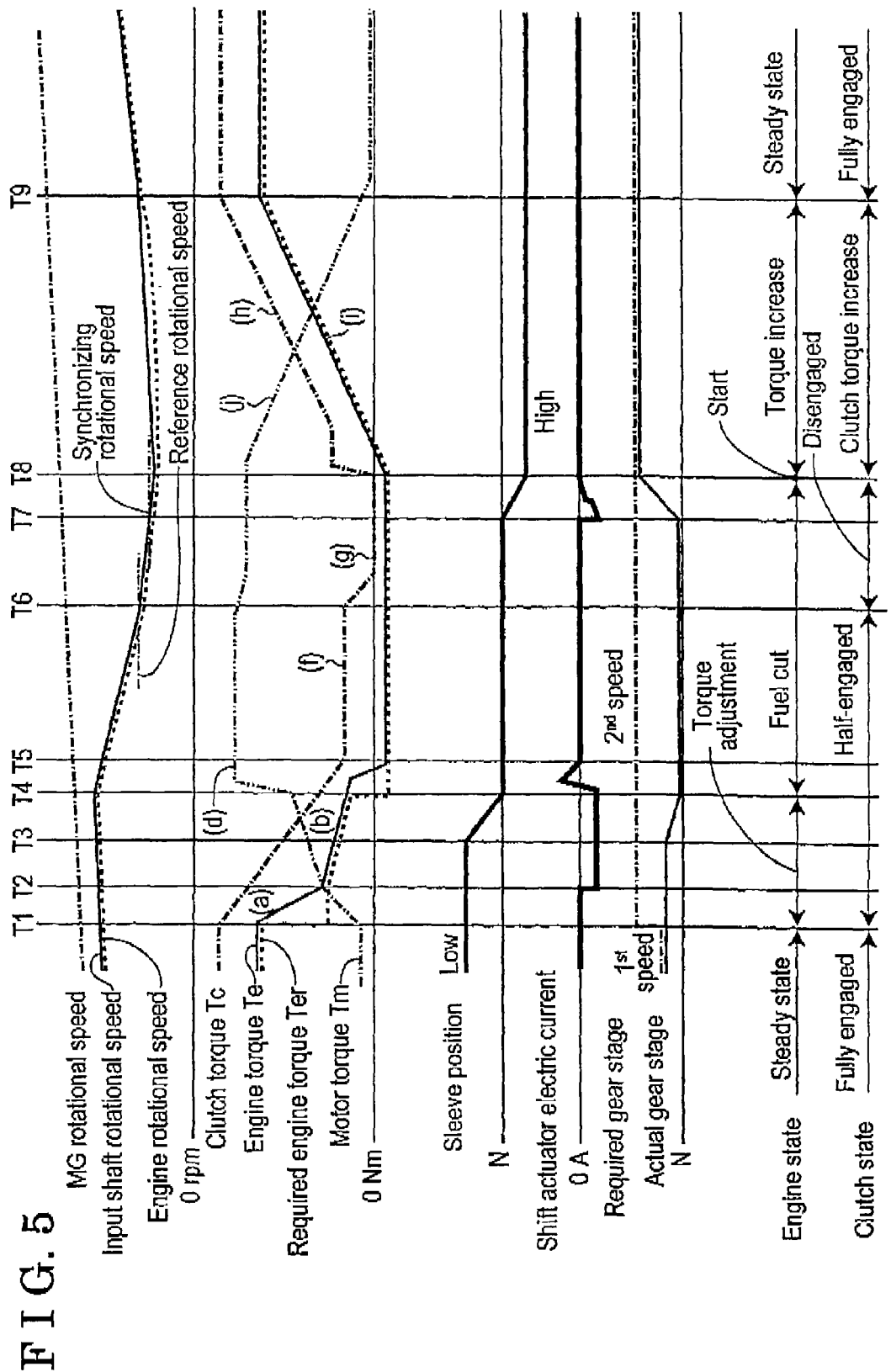
FIG. 5 is a timeline chart illustrating a relation between a course of time and a motor generator rotational speed, an input shaft rotational speed, an engine rotational speed, a clutch torque, an engine torque, a required engine torque, a motor torque, a sleeve position, a shift actuator electric current, a required gear stage, an actual gear stage, states of the engine, and states of the clutch during an up-shift operation.

In step S14, which is executed simultaneously with step S13, the TM-ECU 13 outputs a control signal to the MG-ECU14 to start control for increasing the motor torque Tm, which is outputted from the motor generator MG, as indicated at (d) in FIG. 5. The motor torque Tm is controlled to compensate for the amount of reduction of the engine torque Te to be inputted to the ring gear DF-1 of the differential mechanism DF.

In step S15, which is executed simultaneously with step S13 and step S14, the TM-ECU 13 drives the clutch actuator 29 to decrease the clutch torque Tc to a predetermined clutch torque, which is a torque smaller than the clutch torque at a time when the clutch is in a fully engaged state and greater than zero, as indicated at (f) in FIG. 5, to bring the clutch 2 into a state generally referred to as a half-engaged state. After steps S13 to S15 end, the control program shifts to step S16.

In a case where the TM-ECU 13 determines in step S16 that the transmission TM is brought into the neutral state (YES in step S16, at time 74 in FIG. 5), the control program shifts to step S18. In a case where the TM-ECU 13 determines in step S16 that the transmission TM is not brought into the neutral state (NO in step S16), a processing of step S16 is repeated.

In a state where the transmission TM is in the neutral state, any of the idler gears (the first driven gear 51, the second driven gear 52, the third drive gear 43, the fourth drive gear 44, the fifth drive gear 45) are not rotatably connected to the input shaft 31 and the output shaft 32; therefore, a rotational moment is generated only at each of components integrally rotating with the input shaft 31, i.e., the rotational moment is generated, for example, at the input shaft 31, the first drive gear 41, the second drive gear 42, the second hub 121, the third hub 131, the second sleeve 122, the third sleeve 132, and the clutch disc 22, and the like. Accordingly, even in a case where the clutch 2 is in the half-engaged state, the drive shaft EG-1 and the input shaft 31 integrally rotate with each other while the clutch 2 scarcely slips. Thus, the rotational speed of the input shaft 31 is reliably decreased as the engine rotational speed Ne is decreased.

In a case where the TM-ECU 13 determines in step S18 on the basis of a detection signal from the input shaft rotational speed sensor 91 that the rotational speed of the input shaft 31 is decreased to the rotational speed equal to or smaller than a reference rotational speed (YES in step S18, at time T6 in FIG. 5), the control program shifts from step S18 to step S19. In a case where the TM-ECU 13 determines in step S18 that the rotational speed of the input shaft 31 is not decreased to the rotational speed equal to or smaller than the reference rotational speed (NO in step S18), a processing of step S18 is repeated. The reference rotational speed is a rotational speed greater by a predetermined rotational speed than a synchronizing rotational speed. The synchronizing rotational speed will be described later in this disclosure.

In step S19, the TM-ECU 13 drives the clutch actuator 29 to start executing a control to reduce the clutch torque Tc to zero as indicated at (g) in FIG. 5 and to disengage the clutch 2. After step S19 ends, the control program shifts from step S19 to step S20.

In a case where the TM-ECU 13 determines in step S20 on the basis of a detection signal from the clutch actuator 29 that the clutch torque Tc has reached zero and the clutch 2 is in a disengaged state (YES in step S20), the control program shifts from step S20 to step S21. In a case where the TM-ECU 13 determines in step S20 that the clutch 2 is not in the disengaged state (NO in step S20), a processing of step S20 is repeated.

In a case where the TM-ECU 13 determines in step S21 on the basis of a detection signal from the input shaft rotational speed sensor 91 that the rotational speed of the input shaft 31 is decreased to the rotational speed equal to or smaller than the synchronizing rotational speed (YES in step S21, at time T7 in FIG. 5), the control program shifts from step S21 to step S22. In a case where the TM-ECU 13 determines in step S21 that the rotational speed of the input shaft 31 is not decreased to the rotational speed equal to or smaller than the synchronizing rotational speed (NO in step S21), a processing of step S21 is repeated.

The synchronizing rotational speed corresponds to the rotational speed of the input shaft 31 in a state where the rotational speed difference, which is between a rotational speed of an idler gear of a subsequent gear stage (the second driven gear 52, the third drive gear 43, the fourth drive gear 44, the fifth drive gear 45,) and the rotational speed of the input shaft 31 or the output shaft 32 to which the idler gear of the subsequent gear stage is rotatably connected, is within a rotational speed tolerance having a predetermined range. In particular, in the case of an up-shift operation from the first speed to the second speed, the synchronizing rotational speed corresponds to the rotational speed of the input shaft 31 in a state where the rotational speed difference between the rotational speed of the second driven gear 52 and rotational speed of the output shaft 32 is within the rotational speed tolerance and the second driven gear 52 is rotating almost in synchronization with the output shaft 32. Further, in the case of an up-shift operation to each of the third, fourth, and fifth speed, the synchronizing rotational speed corresponds to the rotational speed of the input shaft 31 in a state where the rotational speed difference between the rotational speed of each of the third drive gear 43, the fourth drive gear 44, and the fifth drive gear 45 and the rotational speed of the input shaft 31 is within the rotational speed tolerance and each of the third drive gear 43, the fourth drive gear 44, and the fifth drive gear 45 is rotating almost in synchronization with the input shaft 31.

To describe the rotational speed tolerance, for example, even in a state where a difference is generated between the rotational speeds of the second driven gear 52 and the output shaft 32, the difference between the rotational speeds is said to be within the rotational speed tolerance when the first sleeve 112 is allowed to be engaged with the second driven gear 52. Likewise, as another example, even in a state where a difference is generated between the rotational speed of the input shaft 31 and the rotational speed of the third drive gear 43 or the fourth drive gear 44, the difference between the rotational speeds is said to be within the rotational speed tolerance when the second sleeve 122 is allowed to be engaged with the third drive gear 43 or the fourth drive gear 44. Similarly, as another example, even in a state where a difference is generated between the rotational speeds of the fifth drive gear 45 and the input shaft 31, the difference between the rotational speeds is said to be within the rotational speed tolerance when the third sleeve 132 is allowed to be engaged with the fifth drive gear 45. The synchronizing rotational speed is calculated by the TM-ECU 13 on the basis of detection signals from the input shaft rotational speed sensor 91 and the output shaft rotational speed sensor 92.

In step S22, the TM-ECU 13 drives any one of the shift actuators for the subsequent gear stage (the first shift actuator 114, the second shift actuator, and the third shift actuator) in the up-shift operation, to move the sleeve of the presently established gear stage (the first sleeve 112, the second sleeve 122, or the third sleeve 132), thereby starting the up-shift operation for establishing the subsequent gear stage. After step S22 ends, the control program shifts from step S22 to step S23.

In a case where the TM-ECU 13 determines in step S23 on the basis of a signal outputted from the shift actuator (the first shift actuator 114, the second shift actuator, the third shift actuator) that the up-shift operation is completed (YES in S23, at time T8 in FIG. 5), the control program shifts from step S23 to step S24. In a case where the TM-ECU 13 determines in step S23 that the up-shift operation is not competed (NO in S23), a processing of step S23 is repeated.

In step S24, the TM-ECU 13 drives the clutch actuator 29 to thereby gradually increase the clutch torque Tc to a torque that equals to the torque in a fully engaged state of the clutch 2, as indicated at (h) in FIG. 5.

In step S25, which is executed simultaneously with step S24, the TM-ECU 13 outputs a control signal to the EG-ECU 12 to start the engine EG and to start executing a control for restoring the engine torque Te to the required engine torque Ter, which is calculated based on the accelerator position Ac, as indicated at (i) in FIG. 5. As a result, the engine torque Te increases.

In step S26, which is executed simultaneously with steps S24 and S25, the TM-ECU 13 outputs a control signal to the MG-ECU 14 to start executing a control for restoring the motor torque Tm to a motor torque calculated based on the accelerator position Ac, as indicated at (j) in FIG. 5. As a result, the motor torque Tm decreases. After steps S24, S25, and S26 end, the control program shifts to step S27.

In a case where the TM-ECU 13 determines in step S27 on the basis of a detection signal from the clutch actuator 29 that the clutch 2 is in the fully engaged state (YES in step S27, at time T9 in FIG. 5), the control program shifts from step S27 to step S28. In a case where the TM-ECU 13 determines in step S27 that the clutch 2 is not in the fully engaged state (NO in step S27), a processing of step S27 is repeated.

In step S28, the TM-ECU 13 outputs a shift completion signal to the HV-ECU 11, the EG-ECU 12, and the MG-ECU 14, thereby passing the authority for controlling the engine EG to the EG-ECU 12 and passing the authority for controlling the motor generator MG to the MG-ECU 14. After step S28 ends, the control program returns to step S1.

Next, the down-shift operation will be explained as follows with reference to the flowchart of FIG. 3 and the timeline chart of FIG. 6.

In step S30, in a case where the TM-ECU 13 determines that the engine torque Te the engine EG is actually outputting is greater than the reference torque Ter1 (YES in step S30), the control program shifts to step S33. In a case where the TM-ECU 13 determines that the engine torque Te the engine EG is actually outputting is equal to or smaller than the reference torque value Ter1 (NO in step S30), the control program shifts to step S31. The reference torque Ter1 is the torque calculated in step S101 in FIG. 4, which will be described in detail later.

In step S31, the TM-ECU13 executes the aforementioned first neutral processing. When the first neutral processing starts, the control program shifts to step S201 in FIG. 12.

In step S32, which is executed simultaneously with step S31, the TM-ECU 13 outputs a control signal to the MG-ECU 14 to thereby start executing a control for increasing the motor torque Tm the motor generator MG outputs. The motor torque Tm is controlled to compensate for the amount of reduction of the engine torque Te to be inputted to the ring gear DF-1 of the differential mechanism DF. After step S32 ends, the control program shifts to step S36.

In step S33, the TM-ECU 13 starts the second neutral processing. As a result, the engine torque Te gradually decreases. The second neutral processing will be described in detail later with reference to the flow chart illustrated in FIG. 4.

Figure 6:
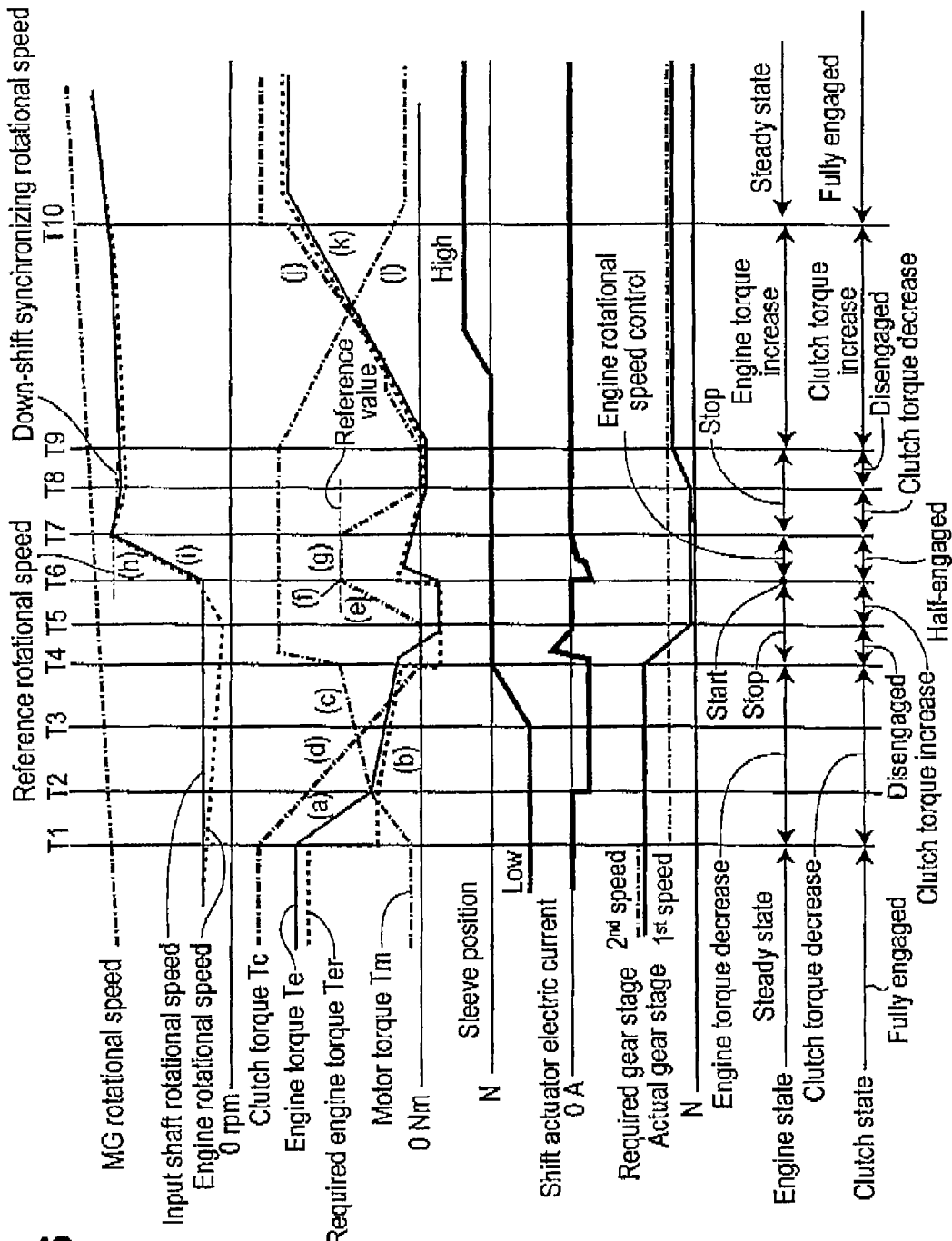
FIG. 6 is a timeline chart illustrating a relation between a course of time and a motor generator rotational speed, an input shaft rotational speed, an engine rotational speed, a clutch torque, an engine torque, a required engine torque, a motor torque, a sleeve position, a shift actuator electric current, a required gear stage, an actual gear stage, states of the engine, and states of the clutch during a down-shift operation.

In step S34, which is executed simultaneously with step S33, the TM-ECU 13 outputs a control signal to the MG-ECU 14 to start a control for increasing the motor torque Tm outputted from the motor generator MG, as indicated at (c) in FIG. 6. The motor torque Tm from the motor generator MG is controlled to compensate for the amount of reduction of the engine torque Te to be inputted to the ring gear DF-1 of the differential mechanism DF, In step S35, which is executed simultaneously with step S33 and step S34, the TM-ECU 13 starts executing a control to drive the clutch actuator 29 and to gradually decrease the clutch torque Tc, as indicated at (d) in FIG. 6, to bring the clutch torque Tc to zero after a predetermined length of time has elapsed and maintains the clutch torque Tc at zero during a period between the time T4 and T5, After step S33, step S34, and step S35 end, the control program shifts to step S36.

In a case where the TM-ECU 13 determines in step S36 that the transmission TM is brought into the neutral state (YES in step S36), the control program shifts from step S36 to step S37. In a case where the TM-ECU 13 determines in step S36 that the transmission TM is not brought into the neutral state (NO in step S36), a processing of step S36 is repeated.

In step S37, the TM-ECU 13 drives the clutch actuator 29 to thereby increase the clutch torque Tc, as indicated at (e) in FIG. 6. After step S37 ends, the control program shifts from step S37 to step S38.

In a case where the TM-ECU 13 determines in step S38 on the basis of a detection signal from the clutch actuator 29 that the clutch torque To has reached a reference value (YES in step S38, at time T6 in FIG. 6), which is indicated at (f) in Fig, 6, the control program shifts from step S38 to step S39. In a case where the TM-ECU 13 determines in step S38 that the clutch torque Tc has not reached the reference value (NO in step S38), a processing of step S38 is repeated.

In step S39, the TM-ECU 13 executes an engine rotational speed control. More specifically, the TM-ECU 13 drives the clutch actuator 29 to thereby control the clutch torque Tc to be maintained at the reference value as indicated at (g) in FIG. 6, thereby bringing the clutch 2 into the half-engaged state. Then, the TM-ECU 13 outputs a control signal to the EG-ECU 12 to start the engine EG and to gradually increase the engine rotational speed Ne as indicated at (h) in FIG. 6. At this time, the clutch 2 is in the half-engaged state: therefore, as indicated at (i) in Fig, 6, the rotational speed of the input shaft 31 gradually increases in accordance with the increase of the engine rotational speed Ne. After step S39 ends, the control program shifts from step S39 to step S40.

In a case where the TM-ECU 13 determines in step S40 on the basis of a detection signal from the input shaft rotational speed sensor 91 that the rotational speed of the input shaft 31 has reached the rotational speed equal to or greater than a reference rotational speed (YES in step S40, at time T7 in FIG. 6), the control program shifts from step S40 to step S41. In a case where the TM-ECU 13 determines in step S40 that the rotational speed of the input shaft 31 has not reached the rotational speed equal to or greater than the reference rotational speed (NO in step 540), a processing of step S40 is repeated. The reference rotational speed is a rotational speed greater by a predetermined rotational speed than a down-shift synchronizing rotational speed. The down-shift synchronizing rotational speed will be described later in this disclosure.

In step S41, the TM-ECU 13 outputs a control signal to stop the engine EG to thereby stop the engine rotational speed control. Furthermore, the TM-ECU 13 drives the clutch actuator 29 to start executing a control to bring the clutch torque Tc to zero to disengage the clutch 2. After step S41 ends, the control program shifts from step S41 to step S42.

In a case where the TM-ECU 13 determines in step S42 on the basis of a detection signal of the input shaft rotational speed sensor 91 that the rotational speed of the input shaft 31 is decreased to the rotational speed equal to or smaller than the down-shift synchronizing rotational speed and that the clutch 2 is disengaged in addition (YES in step S42, at time T8 in FIG. 6), the control program shifts from step S42 to step S43. In a case where the TM-ECU 13 determines in step S42 that the rotational speed of the input shaft 31 is not decreased to the rotational speed equal to or smaller than the down-shift synchronizing rotational speed or in a case where the TM-ECU 13 determines that the clutch 2 is not disengaged (NO in step S42), a processing of step S42 is repeated. The down-shift synchronizing rotational speed corresponds to the rotational speed of the input shaft 31 in a state where a difference between the rotational speed of each idler gear of a subsequent gear stage for the down-shift operation (the first driven gear 51, the second driven gear 52, the third drive gear 43, the fourth drive gear 44) and the rotational speed of the input shaft 31 or the output shaft 32 to which each idler gear of the subsequent gear stage for the down-shift operation is rotatably connected is within a rotational speed tolerance having a predetermined range.

In step S43, the TM-ECU 13 drives the shift actuator corresponding to the subsequent gear stage in the down-shift operation (the first shift actuator 114, the second shift actuator) to move the first sleeve 112 or the second sleeve 122, thereby starting the down-shift operation for establishing the subsequent gear stage. After step S43 ends, the control program shifts from step S43 to step S44.

In a case where the TM-ECU 13 determines in step S44 on the basis of a signal outputted from the shift actuator for the subsequent gear stage in the down-shift operation (the first shift actuator 144, the second shift actuator) that the down-shift operation is completed (YES in step S44, at time T9 in FIG. 6), the control program shifts from step S44 to step S45. In a case where the TM-ECU 13 determines in step S44 that the down-shift operation is not completed (NO in step S44), a processing of step S44 is repeated.

In step S45, the TM-ECU 13 drives the clutch actuator 29 to thereby start executing a control for gradually increasing the clutch torque Tc to a torque that equals to the torque in the fully engaged state of the clutch 2, as indicated at (j) in FIG. 6. After step S45 ends, the control program shifts from step S45 to step S46.

In step S46, which is executed simultaneously with step S45, the TM-ECU 13 outputs a control signal to the EG-ECU 12 to start the engine EG and to start executing a control for restoring the engine torque Te to the required engine torque Ter, which is calculated based on the accelerator position Ac, as indicated at (k) in FIG. 6. As a result, the engine torque Te increases.

In step S47, which is executed simultaneously with steps S45 and S46, the TM-ECU 13 outputs a control signal to the MG-ECU 14 to start executing a control for restoring the motor torque Tm to a motor torque calculated based on the accelerator position Ac, as indicated at (l) in FIG. 6. As a result, the motor torque Tm decreases. After steps S45, S46, and S47 end, the control program shifts to step S48.

In a case where the TM-ECU 13 determines in step S48 on the basis of a detection signal from the clutch actuator 29 that the clutch 2 is in the fully engaged state (YES in step S48, at time T10 in FIG. 6), the control program shifts from step S48 to step S49. In a case where the TM-ECU 13 determines in step S48 that the clutch 2 is not in the fully engaged state (NO in step S48), a processing of step S48 is repeated.

In step S49, the TM-ECU 13 outputs the shift completion signal to the HV-ECU 11, the EG-ECU 12, and the MG-ECU 14, thereby passing the authority for controlling the engine EG to the EG-ECU 12 and passing the authority for controlling the motor generator MG to the MG-ECU 14. After step S49 ends, the control program returns to step S1, The second neutral processing, which is executed by the TM-ECU 13, will be described next with references to FIG. 4 and the timeline charts of FIGS. 5 and 6. When the second neutral processing is started, the TM-ECU 13 in step S101 calculates the reference torque Ter1. More specifically, the TM-ECU 13 calculates the reference torque Ter1 by obtaining a learned torque Tr corresponding to the present gear stage by referring to the memorized data for learned torques, which is illustrated in FIG. 10 and by adding an adjustment torque Tα to the obtained learned torque Tr. In the embodiment, the reference torque Ted is calculated based on the below formula, which is indicated as (1).

$$Ter1 = Tr \times (1+\alpha) \quad (1)$$

Ter1 is the reference torque. Tr is the learned torque. α is an adjustment value. The learned torque Tr selected for the above formula is a torque memorized through a process in step S 106, which is the learned torque Tr corresponding to the present gear stage. The process in step S106 will be described later. In a case where the process in step S106 has never been executed, an initially defined default value of the learned torque Tr is used. The adjustment value a is a value equal to or more than 0 and equal to or less than 1. The embodiment uses 0.2 as the adjustment value a. The aforementioned adjustment torque Ta is a value obtained by multiplying the reference torque Ter1 by the adjustment value α.

Next, the TM-ECU 13 controls the engine EG to be at the calculated reference torque Ter1, as indicated at (a) in FIG. 5 at time T1 in FIG. 5 and at (a) in FIG. 6 at time T1 in FIG. 6. After step S101 ends, the control program shifts to step S102.

In a case where the TM-ECU 13 in step S102 determines that the engine torque Te the engine EG actually outputs has become equal to the reference torque Ter1 (YES in step S102), the control program shifts to step S103. In a case where the TM-ECU 13 in step S102 determines that the engine torque Te the engine EG actually outputs has not become equal to the reference torque Ter1 (NO in step S102), a processing of step S103 is repeated.

In step S103, the TM-ECU 13 outputs a control signal to the shift actuator (the first shift actuator 114, the second shift actuator, the third shift actuator) to drive the shift actuator. As a result, the sleeve (the first sleeve 112, the second sleeve 122, the third sleeve 132) starts moving to the corresponding neutral position, as indicated at T2 in FIG. 5 and at T2 in FIG. 6. After step S103 ends, the control program shifts to step S104.

In step S104, the TM-ECU 13 starts executing control for gradually decreasing the required engine torque Ter. In the embodiment, the TM-ECU 13 calculates a required engine torque Ter(n) based on the below formula, which is indicated as (2).

$$Ter(n) = Ter(n-1) - Det \times et \quad (2)$$

Ter(n) is the required engine torque. Ter(n-1) is the previously calculated required engine torque. Det is the speed the engine torque decreases. et is an elapsed time from step S104 previously processed.

In a case where a process in step S104 has never been executed, the required torque Ter calculated in step S101 serves as the previously calculated required engine torque Ter(n-1). Next, the TM-ECU 13 controls the engine EG so as to be at the required engine torque Ter. As a result, the engine torque Te gradually decreases, as indicated at (b) in FIG. 5 and at (b) in FIG. 6. After step S104 ends, the control program shifts to step S105.

In a case where the TM-ECU 13 in step S105 determines that a stroke at the shift actuator (the first shift actuator 114, the second shift actuator, the third shift actuator) is started (YES in step S105, at T3 in FIG. 5 and at T3 in FIG. 6), the control program shifts to step S106. In a case where the TM-ECU 13 in step S105 determines that the stroke at the shift actuator is not started (NO in step S105), the control program returns to step S104.

In step S106, the TM-ECU 13 memorizes the engine torque Te presently being generated by the engine EG in relation to the presently established gear stage as the learned toque Tr and overwrites the memorized data for learned torque, which is illustrated in FIG. 10. After step S106 ends, the control program shifts to step S107.

In step S107, the TM-ECU 13 calculates the required engine torque Ter(n) based on the aforementioned formula indicated as (2). Next, the TM-ECU 13 controls the engine EG to be at the required engine torque Ter. After step S107 ends, the control program shifts to step S108.

In a case where the TM-ECU 13 determines in step S108 that the transmission TM has brought into the neutral state (YES in step S108) based on the stroke at the shift actuator (the first shift actuator 114, the second shift actuator, or the third shift actuator), which is driven, the second neutral processing ends. In a case where the TM-ECU 13 determines in step S108 that that the transmission has not brought into the neutral state (NO in step S108), the control program returns to step S107.

Advantages of the embodiment will be described next. As described above, the TM-ECU 13, at a time of performing a shift operation from the present gear stage to a subsequent gear stage, operates the shift actuator (the first shift actuator 114, the second shift actuator, the third shift actuator) to control the sleeve (the first sleeve 112, the second sleeve 122, the third sleeve 132) in an engaged state engaged with the idler gear of the present gear stage (the first driven gear 51, the second driven gear 52, the third drive gear 43, the fourth drive gear 44, the fifth drive gear 45) to disengage from the idler gear of the present gear stage while the clutch 2 is still engaged and in a state where the clutch 2 is not completely disengaged, by operating the shift actuator while gradually reducing the engine torque Te as indicated at (b) in FIG. 5, at (b) in FIG. 6, and in step S104 in FIG. 4. The TM-ECU 13 serves as the shift execution portion. Each of the first sleeve 112, the second sleeve 122, the third sleeve 132 serves as the connecting portion.

By decreasing the engine torque Te, a load in a rotational direction is decreased, for example, between the sleeve (the first sleeve 112, the second sleeve 122, the third sleeve 132) and the idler gear (the first driven gear 51, the second driven gear 52, the third drive gear 43, the fourth drive gear 44, the fifth drive gear 45) and between the sleeve and the hub (the first hub 111, the second hub 121, the third hub 131) so that a frictional resistance in the axial direction is decreased between the sleeve and the idler gear and between the sleeve and the hub at which the sleeve is arranged. As a result, the sleeve is allowed to move in the axial direction so that the sleeve disengages from the idler gear.

Without a process of disconnecting the clutch 2 on disengaging the sleeve (the first sleeve 112, the second sleeve 122, the third sleeve 132) from the idler gear (the first driven gear 51, the second driven gear 52, the third drive gear 43, the fourth drive gear 44, the fifth drive gear 45), a length of time for disengaging the sleeve from the idler gear may be shortened by a length of time for disconnecting the clutch 2. As a result, a shift time may be shortened by a length of time for bringing the transmission TM into the neutral state.

Furthermore, the TM-ECU 13 operates the shift actuator (the first shift actuator 114, the second shift actuator, the third shift actuator) while gradually decreasing the engine torque Te from the engine EG. In a state where the engine torque Te is rapidly decreased, a frictional torque from the engine EG acts on the sleeve (the first sleeve 112, the second sleeve 122, the third sleeve 132), resulting in increase of a load in the rotational direction, for example, between the sleeve and the idler gear (the first driven gear 51, the second driven gear 52, the third drive gear 43, the fourth drive gear 44, the fifth drive gear 45) and between the sleeve and the hub (the first hub 111, the second hub 121, the third hub 131), which in turn increases a frictional resistance, for example, between the sleeve and the idler gear and between the sleeve and the hub. Gradually reducing the engine torque Te restrains the sleeve from being unable to disengage from the idler gear due to the increase of the frictional resistance. As a result, the transmission TM is reliably brought into the neutral state without disengaging the clutch 2.

Figure 4:
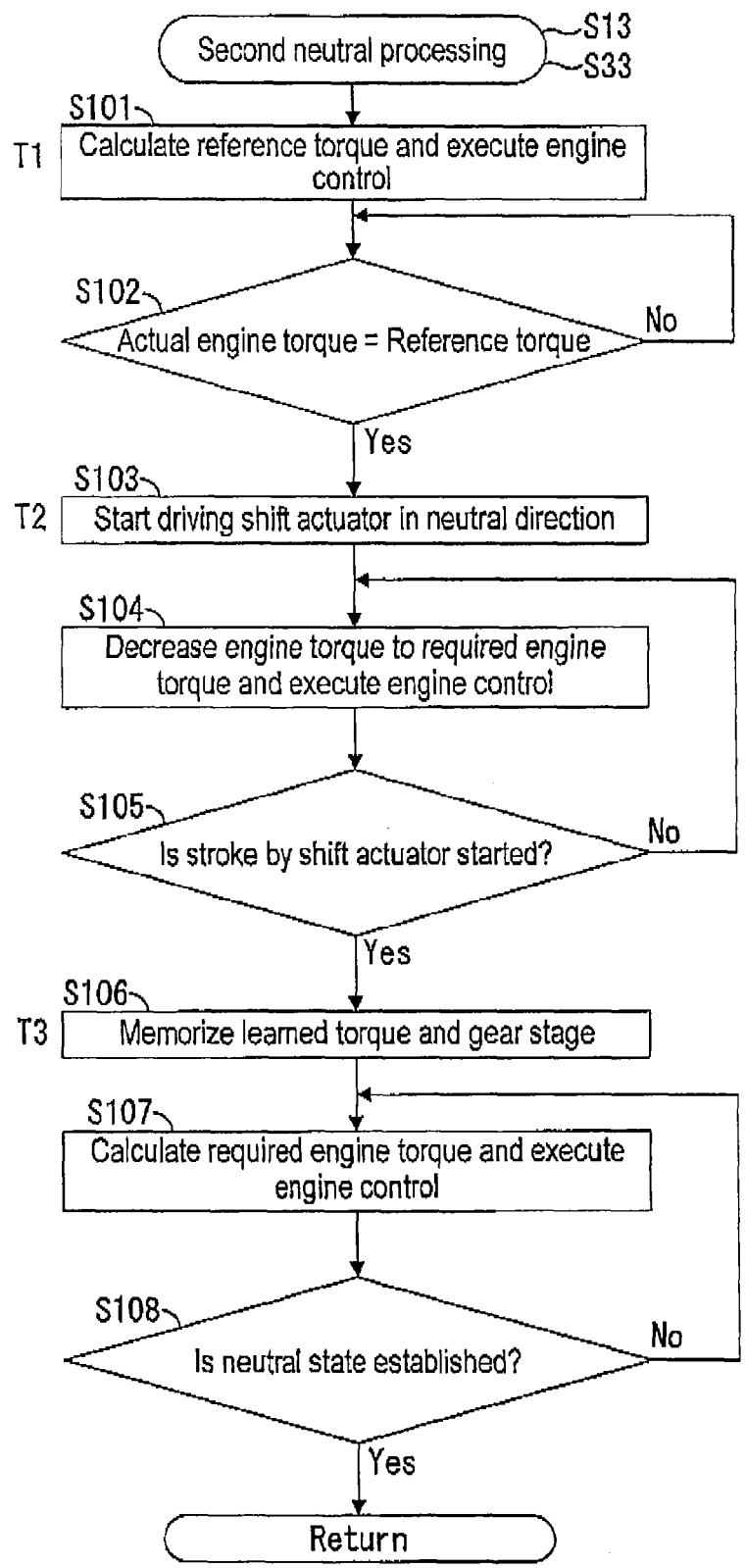
FIG. 4 is a flowchart of a second neutral processing routine, which is a control program to be executed by the TM-ECU illustrated in FIG. 1.

As step S103 in FIG. 4 indicates, the TM-ECU 13 operates the shift actuator (the first shift actuator 114, the second shift actuator, the third shift actuator) while gradually decreasing the engine torque Te, as indicated in step S104 in FIG. 4, at (b) in FIG. 5 and at (b) in FIG. 6, after decreasing the engine torque Te to the reference torque Ter1, as indicated in step S101 in FIG. 4, at (a) in FIG. 5, and at (a) in FIG. 6.

By gradually decreasing the engine torque Te after decreasing the engine torque Te to the reference torque Ter1, a length of time to disengage the sleeve (the first sleeve 112, the second sleeve 122, the third sleeve 132) from the idler gear (the first driven gear 51, the second driven gear 52, the third drive gear 43, the fourth drive gear 44, the fifth drive gear 45) may be shortened compared to when the engine torque Te is gradually reduced without reducing the engine torque Te to the reference torque Ter1. As a result, the neutral state of the transmission TM may be established at a shorter time.

When the sleeve (the first sleeve 112, the second sleeve 122, the third sleeve 132), which is in an engaged state engaged with the idler gear of the present gear stage (the first driven gear 51, the second driven gear 52, the third drive gear 43, the fourth drive gear 44, the fifth drive gear 45), is disengaged from the idler gear of the present gear stage, the TM-ECU 13 memorizes the engine torque Te at a time when movement of the sleeve is detected as a learned torque Tr in step S106 in FIG. 4 and calculates the reference torque Ter1 based on the learned torque Tr in step 101 in FIG. 4.

Figure 11:
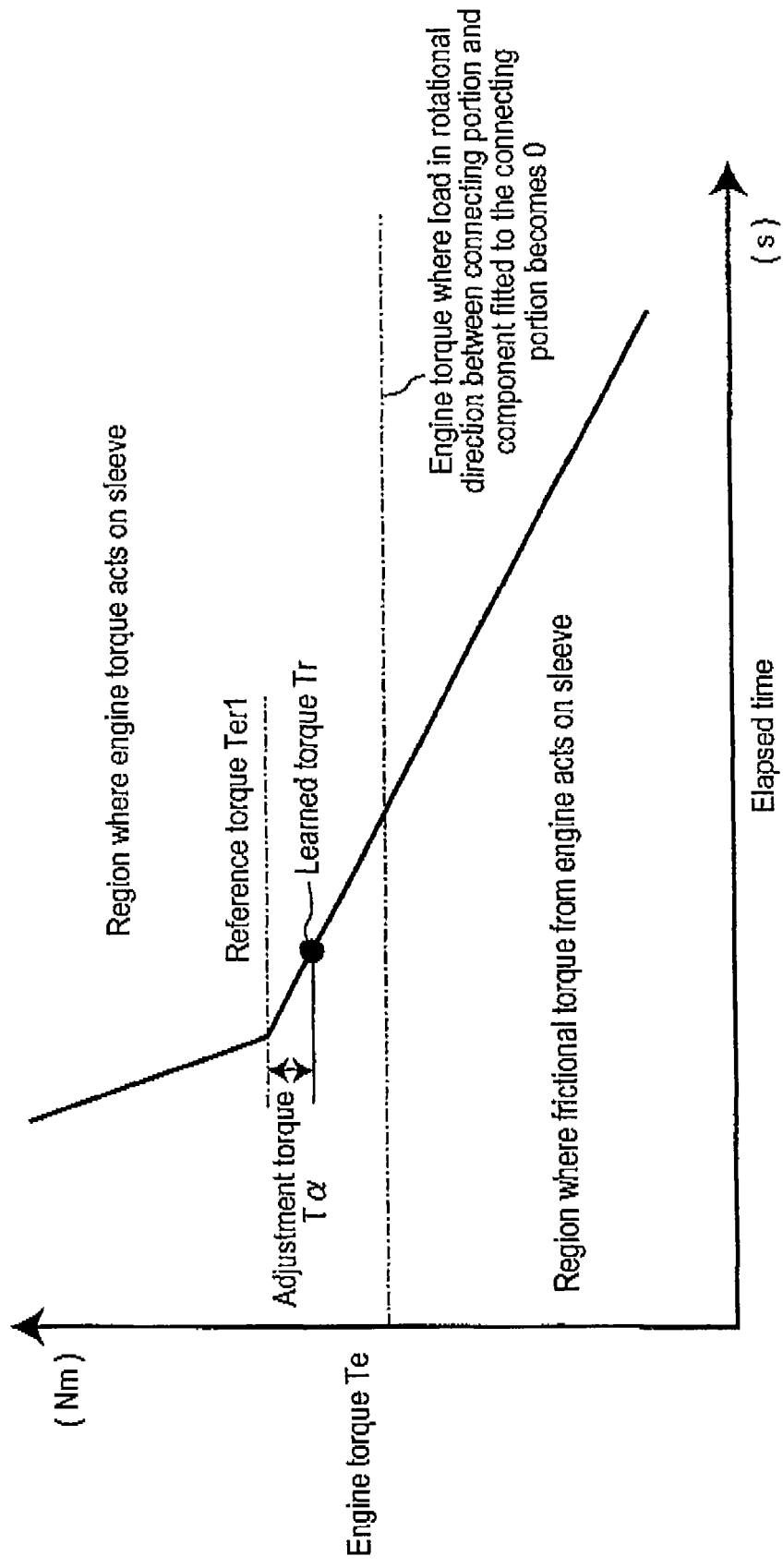
FIG. 11 is a graph illustrating a relation between the engine torque and elapsed time, which is an enlarged view drawing of FIGS. 5 and 6 at a time a sleeve disengages.

Accordingly, the reference torque Ter1 is calculated based on the learned torque Tr, which is the engine torque Te outputted from the engine EG at a time when movement of the sleeve (the first sleeve 112, the second sleeve 122, the third sleeve 132) is detected so that, as FIG. 11 illustrates, the engine torque Te may be gradually decreased from the reference torque Ter1, which is the torque at which the frictional torque from the engine EG does not act on the sleeve. As a result, the sleeve is restrained from being unable to disengage from the idler gear (the first driven gear 51, the second driven gear 52, the third drive gear 43, the fourth drive gear 44, the fifth drive gear 45) due to the frictional torque from the engine EG acting on the sleeve. Furthermore, a time length for disengaging the sleeve in an engaged state engaged with the idler gear of the present gear stage (the first driven gear 51, the second driven gear 52, the third drive gear 43, the fourth drive gear 44, the fifth drive gear 45) from the idler gear of the present gear stage may be shortened so that the transmission TM may establish the neutral state in a shorter length of time.

The TM-ECU 13 calculates the reference torque Ter1 by adding an adjustment torque Tα to the learned torque Tr in step S101 in FIG. 4. Accordingly, as FIG. 11 illustrates, the engine torque Te may be reliably gradually decreased from the reference torque Ter1, which is the torque at which the frictional torque from the engine EG does not act on the sleeve (the first sleeve 112, the second sleeve 122, the third sleeve 132), even in a case where a control that uses the engine torque Te as the learned torque Tr includes an inaccuracy. As a result, the sleeve is reliably restrained from being unable to disengage from the idler gear (the first driven gear 51, the second driven gear 52, the third drive gear 43, the fourth drive gear 44, the fifth drive gear 45) due to the frictional torque from the engine EG acting on the sleeve. The adjustment torque Tα is defined as a value that restrains the frictional torque from the engine EG from acting on the sleeve even in a case where a control that uses the engine torque To as the learned torque Tr includes an inaccuracy.

The TM-ECU 13 memorizes the learned torque Tr and a gear stage at a time when movement of the sleeve (the first sleeve 112, the second sleeve 122, the third sleeve 132) is detected in step S106 in FIG. 4 and calculates the reference torque Ter1 based on the learned torque Tr corresponding to the presently established gear stage in step S101 in FIG. 4, when disengaging the sleeve in an engaged state engaged with the idler gear of the present gear stage (the first driven gear 51, the second driven gear 52, the third drive gear 43, the fourth drive gear 44, the fifth drive gear 45) from the idler gear of the present gear stage.

The coefficient of friction, for example, between the sleeve (the first sleeve 112, the second sleeve 122, the third sleeve 132) and the idler gear (the first driven gear 51, the second driven gear 52, the third drive gear 43, the fourth drive gear 44, the fifth drive gear 45) and between the sleeve and the hub (the first hub 111, the second hub 121, the third hub 131) is different for different gear stages. Similarly, gear ratio is different for different gear stages. As a result, the frictional resistance in the axial direction, for example, between the sleeve and the idler gear and between the sleeve and the hub is different for each gear stage. By calculating the reference torque Ter1 appropriate for each gear stage based on the learned torque Tr corresponding to the presently established gear stage, the sleeve is reliably restrained from being unable to disengage from the idler gear due to the difference of the frictional resistance in the axial direction for each gear stage, for example, between the sleeve and the idler gear and between the sleeve and the hub.

Furthermore, the sleeve (the first sleeve 112, the second sleeve 122, the third sleeve 132) is disengaged from the idler gear (the first driven gear 51, the second driven gear 52, the third drive gear 43, the fourth drive gear 44, the fifth drive gear 45) without disengaging the clutch 2. As a result, the TM-ECU 13 may decrease the rotational speed of the input shaft 31 by decreasing the engine torque Te so as to decrease the rotational speed of the engine EG.

Accordingly, difference between the rotational speed of the idler gear of the subsequent gear stage (the second driven gear 52, the third drive gear 43, the fourth drive gear 44, the fifth drive gear 45) and the rotational speed of the corresponding sleeve (the first sleeve 112, the second sleeve 122, the third sleeve 132) may be reduced so that the up-shift operation may be executed by engaging the idler gear of the subsequent gear stage and the sleeve corresponding to the idler gear of the subsequent gear stage without a synchronization mechanism. As a result, a mechanical loss due to sliding movements in the synchronization mechanism may be reduced. Furthermore, a high output shift actuator for operating the synchronization mechanism is not required. Accordingly, the cost of the vehicle drive system 100 may be decreased and the mass of the vehicle drive system 100 may be decreased. In other words, the vehicle drive system 100 may restrain the mechanical loss from increasing without increasing the cost and the mass.

The TM-ECU 13, in step S14, increases the motor torque Tm from the motor generator MG as indicated at (d) in FIG. 5 and at (c) in FIG. 6. As a result, the vehicle is prevented from or restrained from decreasing speed due to the decrease of the engine torque Te from the engine EG so that the drivability of the vehicle drive system 100 is restrained from lowering.

In addition, the TM-ECU 13, after the clutch 2 is disengaged, operates the shift actuator (the first shift actuator 114, the second shift actuator, and the third shift actuator) so as to rotatably connect the idler gear of the subsequent gear stage (the second driven gear 52, the third drive gear 43, the fourth drive gear 44, the fifth drive gear 45) to the input shaft 31 or the output shaft 32 in step S22 in a case where the rotational speed of the input shaft 31 is decreased to the synchronizing rotational speed, which corresponds to the rotational speed of the input shaft 31 in a state where a difference between the rotational speed of each idler gear of the subsequent gear stage and the rotational speed of the input shaft 31 or the output shaft 32 to which each idler gear of the subsequent gear stage is arranged is within the rotational speed tolerance having the predetermined range.

Accordingly, the idler gear of the subsequent gear stage (the second driven gear 52, the third drive gear 43, the fourth drive gear 44, the fifth drive gear 45) and the sleeve (the first sleeve 112, the second sleeve 122, the third sleeve 132) to be engaged with the idler gear of the subsequent gear stage engage in a state where the idler gear of the subsequent gear stage is rotating almost in synchronization with the sleeve. As a result, the idler gear of the subsequent gear stage is reliably rotatably engaged with the input shaft 31 or the output shaft 32 to which the idler gear of the subsequent gear stage is arranged, to reliably execute the up-shift operation so that the shock may be decreased at the time of engagement of the sleeve and the idler gear of the subsequent gear stage due to the rotational speed difference between the sleeve and the idler gear of the subsequent gear stage, which in turn decreases, for example, the shift shock and the generation of noise in the vehicle drive system 100 at the time of executing the up-shift operation.

Furthermore, the TM-ECU 13 decreases the clutch torque Tc to a reference clutch torque in step S15 and as indicated at (f) in FIG. 5. The reference clutch torque is the clutch torque Tc lower than the clutch torque Tc at the time of fully engaged state and larger than zero. As a result, the length of time for disengaging the clutch 2 may be shortend compared to the length of time for disengaging the clutch 2 from the fully engaged state.

Accordingly, in a case of rotatably connecting the idler gear of the subsequent gear stage (the second driven gear 52, the third drive gear 43, the fourth drive gear 44, the fifth drive gear 45) to a shaft (the input shaft 31, the output shaft 32) at which the idler gear of the subsequent gear stage is arranged, the rotational speed of the input shaft 31 is restrained from significantly decreased relative to the synchronizing rotational speed. As a result, the idler gear of the subsequent gear stage may be reliably rotatbly engaged to the shaft (the input shaft 31, the output shaft 32) at which the idler gear of the subsequent gear stage is arranged. In addition, the shock may be decreased at the time of engagement of the sleeve (the first sleeve 112, the second sleeve 122, the third sleeve 132) and the idler gear of the subsequent gear stage due to the rotational speed difference between the sleeve and the idler gear of the subsequent gear stage, which in turn decreases, for example, the shift shock and the generation of noise in the vehicle drive system 100 at the time of executing the up-shift operation.

The TM-ECU 13 disengages the clutch 2 after the sleeve (the first sleeve 112, the second sleeve 122, the third sleeve 132) in an engaged state engaged with the idler gear of the present gear stage (the first driven gear 51, the second driven gear 52, the third drive gear 43, the fourth drive gear 44, the fifth drive gear 45) is disengaged from the idler gear of the present gear stage as indicated in step S19 in FIG. 2 and in step S41 in FIG. 3, and then operates the shift actuator (the first shift actuator 114, the second shift actuator, the third shift actuator) to engage the sleeve for engaging with the idler gear of the subsequent gear stage (the first driven gear 51, the second driven gear 52, the third drive gear 43, the fourth drive gear 44, the fifth drive gear 45) to engage with the idler gear of the subsequent gear stage to rotatably connect the idler gear of the subsequent gear stage to the shaft (the input shaft 31, the output shaft 32) at which the idler gear of the subsequent gear stage is arranged, as indicated in step S22 in FIG. 2 and in step S43 in FIG. 3.

Accordingly, the idler gear of the subsequent gear stage (the first driven gear 51, the second driven gear 52, the third drive gear 43, the fourth drive gear 44, the fifth drive gear 45) is rotatably connected to the shaft (the input shaft 31, the output shaft 32) at which the idler gear of the subsequent gear stage is arranged after the clutch 2 is disconnected. As a result, the load, for example, on the idler gear (the first driven gear 51, the second driven gear 52, the third drive gear 43, the fourth drive gear 44, the fifth drive gear 45), on the sleeve (the first sleeve 112, the second sleeve 122, the third sleeve 132), and on the shaft (the input shaft 31, the output shaft 32) is small at the time of making the idler gear rotatably connect to the shaft (the input shaft 31, the output shaft 32). As a result, the durability of each of the idler gears, of the sleeves, and of the shafts (the input shaft 31, the output shaft 32) is restrained from lowering compared to when making the idler gear rotatably connect to the shaft (the input shaft 31, the output shaft 32) while the clutch 2 is engaged.

In the aforementioned embodiment, the vehicle drive system 100 applied to the hybrid vehicle provided with the motor generator MG is described. Alternatively, the vehicle drive system 100 according to the embodiment may be applied to a vehicle provided with a motor that does not include a power generation function. Furthermore, the vehicle drive system 100 according to the embodiment may be applied to a vehicle that is not provided with the motor generator MG or a motor and that is driven only by the torque of the engine EG.

In the aforementioned embodiment, the sleeve (the first sleeve 112, the second sleeve 122, the third sleeve 132) serves as the connecting portion for rotatably connecting the idler gear (the third drive gear 43, the fourth drive gear 44, the fifth drive gear 45, the first driven gear 51, the second driven gear 52) and the shaft (the input shaft 31, the output shaft 32) so as to be restrained from relatively rotating. In an alternative embodiment, the hub (the first hub 111, the second hub 121, the third hub 131) arranged so as to be restrained from rotating relative to the shaft (the input shaft 31, the output shaft 32) and arranged so as to be movable in the axial direction may serve as the connecting portion.

In the aforementioned embodiments, the transmission TM is a dog-clutch type transmission, however, the transmission TM may be a transmission including a synchronizing mechanism, for example, a synchronizer ring.

In the aforementioned embodiments, the TM-ECU 13 memorizes the engine torque Te presently being generated by the engine EG in relation to the presently established gear stage and overwrites the memorized data for learned torque that is illustrated in FIG. 10. Alternatively, the TM-ECU 13 may memorize the required engine torque Ter at the present time in relation to the presently established gear stage and overwrites the memorized data for learned torque that is illustrated in FIG. 10.

According to an aspect of this disclosure, a vehicle drive system 100 includes a transmission TM including an input shaft 31 receiving an engine torque Te, an output shaft 32 arranged in parallel with the input shaft 31, the output shaft 32 configured to rotatably connect to a driving wheel Wl, Wr, a multiple number of idler gears (a first driven gear 51, a second driven gear 52, a third drive gear 43, a fourth drive gear 44, a fifth drive gear 45) idly rotatably arranged at one of the input shaft 31 and the output shaft 32, a multiple number of fixed gears (a first drive gear 41, a second drive gear 42, a third driven gear 53, a fourth driven gear 54, a fifth driven gear 55) fixed to the other of the input shaft 31 and the output shaft 32 so as not to relatively rotate, the fixed gears being engageable with the idler gears, respectively, a connecting portion (a first sleeve 112, a second sleeve 122, a third sleeve 132, a first hub 111, a second hub 121, a third hub 131) provided at a shaft (the input shaft 31, the output shaft 32) at which the idler gears are arranged, and positioned side by side with the idler gears so as not to rotate relative to the shaft and so as to move in an axial direction of the shaft, the connecting portion for rotatably connecting the idler gear (the first driven gear 51, the second driven gear 52, the third drive gear 43, the fourth drive gear 44, the fifth drive gear 45) and the shaft (the input shaft 31, the output shaft 32) so as to restrain the idler gear and the shaft from rotating relative to each other, and a shift actuator (a first shift actuator 114, a second shift actuator, a third shift actuator) moving the connecting portion in the axial direction to engage the connecting portion with the idler gear that corresponds to the connecting portion so as not to relatively rotate, the shift actuator moving the connecting portion in the axial direction to be disengaged from the idler gear that corresponds to the connecting portion so as to relatively rotate. The vehicle drive system 100 further includes a clutch 2 configured to be arranged between a drive shaft EG-1 receiving the engine torque Te and the input shaft 31, the clutch 2 selectively connecting the drive shaft EG-1 and the input shaft 31. The vehicle drive system 100 furthermore includes a shift execution portion (a TM-ECU 13) operating the shift actuator (the first shift actuator 114, the second shift actuator, the third shift actuator) to control the connecting portion (the first sleeve 112, the second sleeve 122, the third sleeve 132, the first hub 111, the second hub 121, the third hub 131) in an engaged state engaged with the idler gear of a present gear stage (the first driven gear 51, the second driven gear 52, the third drive gear 43, the fourth drive gear 44, the fifth drive gear 45) to disengage from the idler gear of the present gear stage while gradually decreasing the engine torque Te while the clutch 2 is still engaged, when a shift operation from the present gear stage to a subsequent gear stage is executed.

By decreasing the engine torque Te, a load in a rotational direction is decreased, for example, between the connecting portion (the first sleeve 112, the second sleeve 122, the third sleeve 132, the first hub 111, the second hub 121, the third hub 131) and the idler gear (the first driven gear 51, the second driven gear 52, the third drive gear 43, the fourth drive gear 44, the fifth drive gear 45) and between the connecting portion and a component (the first sleeve 112, the second sleeve 122, the third sleeve 132, the first hub 111, the second hub 121, the third hub 131) at which the connecting portion is arranged so that a frictional resistance in the axial direction is decreased, for example, between the connecting portion and the idler gear and between the connecting portion and the component at which the connecting portion is arranged. As a result, the connecting portion is allowed to move in the axial direction so that the connecting portion disengages from the idler gear. Without a process of disconnecting the clutch 2 on disengaging the connecting portion from the idler gear, a length of time for disengaging the connecting portion from the idler gear may be shortened by a length of time for disconnecting the clutch 2. As a result, a shift time may be reduced by a length of time for bringing the transmission TM into a neutral state. Furthermore, the shift execution portion (the TM-ECU 13) operates the shift actuator (the first shift actuator 114, the second shift actuator, the third shift actuator) while gradually decreasing the engine torque Te. In a state where the engine torque Te is rapidly decreased, a frictional torque from an engine EG acts on the connecting portion (the first sleeve 112, the second sleeve 122, the third sleeve 132, the first hub 111, the second hub 121, the third hub 131), resulting in increase of a load in the rotational direction, for example, between the connecting portion and the idler gear and between the connecting portion and the component (the first sleeve 112, the second sleeve 122, the third sleeve 132, the first hub 111, the second hub 121, the third hub 131) at which the connecting portion is arranged, which in turn increases a frictional resistance, for example, between the connecting portion and the idler gear and between the connecting portion and the component at which the connecting portion is arranged. Gradually decreasing the engine torque Te restrains the connecting portion from being unable to disengage from the idler gear due to the increase of the frictional resistance. As a result, the transmission TM is reliably brought into the neutral state without disengaging the clutch 2.

According to another aspect of this disclosure, the shift execution portion (the TM-ECU 13) of the vehicle drive system 100 operates the shift actuator (the first shift actuator 114, the second shift actuator, the third shift actuator) after decreasing the engine torque Te to a reference torque Ter1 to control the connecting portion (the first sleeve 112, the second sleeve 122, the third sleeve 132, the first hub 111, the second hub 121, the third hub 131) in the engaged state engaged with the idler gear of the present gear stage (the first driven gear 51, the second driven gear 52, the third drive gear 43, the fourth drive gear 44, the fifth drive gear 45) to disengage from the idler gear of the present gear stage by operating the shift actuator while gradually decreasing the engine torque Te.

Gradually decreasing the engine torque Te after decreasing the engine torque Te to the reference torque Ter1 may shorten the length of time to disengage the connecting portion (the first sleeve 112, the second sleeve 122, the third sleeve 132, the first hub 111, the second hub 121, the third hub 131) from the idler gear (the first driven gear 51, the second driven gear 52, the third drive gear 43, the fourth drive gear 44, the fifth drive gear 45) compared to when the engine torque Te is gradually decreased without decreasing the engine torque Te to the reference torque Ter1. As a result, the neutral state of the transmission TM may be established at a shorter time.

According to further aspect of this disclosure, the shift execution portion (the TM-ECU 13) of the vehicle drive system 100 memorizes the engine torque Te at a time when movement of the connecting portion (the first sleeve 112, the second sleeve 122, the third sleeve 132, the first hub 111, the second hub 121, the third hub 131) is detected as a learned torque Tr and calculates the reference torque Ter1 based on the learned torque Tr when disengaging the connecting portion in the engaged state engaged with the idler gear of the present gear stage (the first driven gear 51, the second driven gear 52, the third drive gear 43, the fourth drive gear 44, the fifth drive gear 45) to disengage from the idler gear of the present gear stage.

Accordignly, the reference torque Ter1 is calculated based on the learned torque Tr, which is the engine torque Te at a time when movement of the connecting portion (the first sleeve 112, the second sleeve 122, the third sleeve 132, the first hub 111, the second hub 121, the third hub 131) is detected so that the engine torque Te may be gradually decreased from the reference torque Ter1 at which the frictional torque from the engine EG does not act on the connecting portion. As a result, the connecting portion is restrained from being unable to disengage from the idler gear (the first driven gear 51, the second driven gear 52, the third drive gear 43, the fourth drive gear 44, the fifth drive gear 45) due to the frictional torque from the engine EG acting on the connecting portion. Furthermore, a length of time for disengaging the connecting portion in an engaged state engaged with the idler gear of the present gear stage (the first driven gear 51, the second driven gear 52, the third drive gear 43, the fourth drive gear 44, the fifth drive gear 45) from the idler gear of the present gear stage may be shortened so that the neutral state of the transmission TM may be established at a shorter length of time.

According to another aspect of this disclosure, the shift execution portion (the TM-ECU 13) of the vehicle drive system 100 calculates the reference torque Ter1 by adding an adjustment torque Tα to the learned torque Tr.

Accordingly, the engine torque Te may be reliably gradually decreased from the reference torque Ter1 at which the frictional torque from the engine EG does not act on the connecting portion (the first sleeve 112, the second sleeve 122, the third sleeve 132, the first hub 111, the second hub 121, the third hub 131) even in a case where a control that uses the engine torque Te generated by the engine EG as the learned torque Tr includes an inaccuracy. As a result, the connecting portion is reliably restrained from being unable to disengage from the idler gear (the first driven gear 51, the second driven gear 52, the third drive gear 43, the fourth drive gear 44, the fifth drive gear 45) due to the frictional torque from the engine EG acting on the connecting portion.

According to further aspect of this disclosure, the shift execution portion (the TM-ECU 13) of the vehicle drive system 100 memorizes the learned torque Tr and a gear stage at a time when movement of the connecting portion (the first sleeve 112, the second sleeve 122, the third sleeve 132, the first hub 111, the second hub 121, the third hub 131) is detected and calculates the reference torque Ter1 based on the learned torque Tr corresponding to the presently established gear stage when disengaging the connecting portion in an engaged state engaged with the idler gear of the present gear stage (the first driven gear 51, the second driven gear 52, the third drive gear 43, the fourth drive gear 44, the fifth drive gear 45) from the idler gear of the present gear stage.

The coefficient of friction between, for example, the connecting portion (the first sleeve 112, the second sleeve 122, the third sleeve 132, the first hub 111, the second hub 121, the third hub 131) and the idler gear (the first driven gear 51, the second driven gear 52, the third drive gear 43, the fourth drive gear 44, the fifth drive gear 45) and between the connecting portion and the component (the first sleeve 112, the second sleeve 122, the third sleeve 132, the first hub 111, the second hub 121, the third hub 131) at which the connecting portion is arranged is different for different gear stages. Similarly, gear ratio is different for different gear stages. As a result, the frictional resistance in the axial direction, for example, between the connecting portion and the idler gear and between the connecting portion and the component at which the connecting portion is arranged is different for different gear stages. Calculating the reference torque Ter1 appropriate for each gear stage based on the learned torque Tr corresponding to the presently established gear stage reliably restrains the connecting portion from being unable to disengage from the idler gear due to a discrepancy of the frictional resistance in the axial direction for each gear stage, for example, between the connecting portion and the idler gear and between the connecting portion and the component at which the connecting portion is arranged.

According to another aspect of this disclosure, the shift execution portion (the TM-ECU 13) of the vehicle drive system 100 disengages the clutch 2 after the connecting portion (the first sleeve 112, the second sleeve 122, the third sleeve 132, the first hub 111, the second hub 121, the third hub 131) is disengaged from the idler gear of the present gear stage (the first driven gear 51, the second driven gear 52, the third drive gear 43, the fourth drive gear 44, the fifth drive gear 45), operates the shift actuator (the first shift actuator 114, the second shift actuator, the third shift actuator) to control the connecting portion for engaging with the idler gear of the subsequent gear stage (the first driven gear 51, the second driven gear 52, the third drive gear 43, the fourth drive gear 44, the fifth drive gear 45) to engage with the idler gear of the subsequent gear stage to rotatably connect the idler gear of the subsequent gear stage to the shaft (the input shaft 31, the output shaft 32) at which the idler gear of the subsequent gear stage is arranged, and then engages the clutch 2.

Accordingly, the idler gear of the subsequent gear stage (the first driven gear 51, the second driven gear 52, the third drive gear 43, the fourth drive gear 44, the fifth drive gear 45) is rotatably connected to the shaft (the input shaft 31, the output shaft 32) at which the idler gear of the subsequent gear stage is arranged after the clutch 2 is disengaged, so that the load, for example, on the idler gear (the first driven gear 51, the second driven gear 52, the third drive gear 43, the fourth drive gear 44, the fifth drive gear 45) and on the shaft is small at the time of making the idler gear rotatably connect to the shaft. As a result, the durability of each of the idler gears and of the shafts is restrained from lowering compared to making the idler gear rotatably connect to the shaft while the clutch 2 is engaged.

According to further aspect of this disclosure, the shift execution portion (the TM-ECU 13) of the vehicle drive system 100 starts executing a neutral processing (the second neutral processing in step S13 and in step S33) when the engine torque Te is greater than the reference torque Ter1 on executing the shift operation.

By executing the neutral processing (the second neutral processing in step S13 and in step S33), the engine torque Te is gradually decreased after decreasing the engine torque Te to the reference torque Ter1. Gradually decreasing the engine torque Te after decreasing the engine torque Te to the reference torque Ter1 may shorten the length of time to disengage the connecting portion (the first sleeve 112, the second sleeve 122, the third sleeve 132, the first hub 111, the second hub 121, the third hub 131) from the idler gear (the first driven gear 51, the second driven gear 52, the third drive gear 43, the fourth drive gear 44, the fifth drive gear 45) compared to when the engine torque Te is gradually decreased without a process of decreasing the engine torque Te to the reference torque Ter1. As a result, the neutral state of the transmission TM may be established at a shorter time.

According to another aspect of this disclosure, the shift execution portion (the TM-ECU 13) of the vehicle drive system 100 calculates the reference torque Ter1 and executes an engine control in the neutral processing (the second neutral processing in step S13 and in step S33) until the engine torque Te becomes the reference torque Ter1.

By executing the neutral processing (the second neutral processing in step S13 and in step S33), the engine torque Te is gradually decreased after decreasing the engine torque Te to the reference torque Ter1. Gradually decreasing the engine torque Te after decreasing the engine torque Te to the reference torque Ter1 may shorten the length of time to disengage the connecting portion (the first sleeve 112, the second sleeve 122, the third sleeve 132, the first hub 111, the second hub 121, the third hub 131) from the idler gear (the first driven gear 51, the second driven gear 52, the third drive gear 43, the fourth drive gear 44, the fifth drive gear 45) compared to when the engine torque Te is gradually decreased without a process of decreasing the engine torque Te to the reference torque Ter1. As a result, the neutral state of the transmission TM may be established at a shorter time.

According to further aspect of this disclosure, the shift execution portion (the TM-ECU 13) of the vehicle drive system 100 starts a control for driving the shift actuator (the first shift actuator 114, the second shift actuator, the third shift actuator) toward a neutral direction when the engine torque Te becomes the reference torque Ter1 and memorizes the gear stage and the learned torque Tr at a time when an operation of the shift actuator is started where the learned torque Tr is the engine torque Te at the time when the operation of the shift actuator is started.

The reference torque Ter1 is calculated based on the learned torque Tr, which is the engine torque Te at the time when an operation of the shift actuator (the first shift actuator 114, the second shift actuator, the third shift actuator) is started so that the engine torque Te may be gradually decreased from the reference torque Ter1 at which the frictional torque from the engine EG does not act on the connecting portion (the first sleeve 112, the second sleeve 122, the third sleeve 132, the first hub 111, the second hub 121, the third hub 131). As a result, the connecting portion is restrained from being unable to disengage from the idler gear (the first driven gear 51, the second driven gear 52, the third drive gear 43, the fourth drive gear 44, the fifth drive gear 45) due to the frictional torque from the engine EG acting on the connecting portion. Furthermore, a length of time for disengaging the connecting portion in an engaged state engaged with the idler gear of the present gear stage (the first driven gear 51, the second driven gear 52, the third drive gear 43, the fourth drive gear 44, the fifth drive gear 45) from the idler gear of the present gear stage may be shortened so that the neutral state of the transmission TM may be established at a shorter time. The coefficient of friction, for example, between the connecting portion (the first sleeve 112, the second sleeve 122, the third sleeve 132, the first hub 111, the second hub 121, the third hub 131) and the idler gear (the first driven gear 51, the second driven gear 52, the third drive gear 43, the fourth drive gear 44, the fifth drive gear 45) and between the connecting portion and the component (the first sleeve 112, the second sleeve 122, the third sleeve 132, the first hub 111, the second hub 121, the third hub 131) at which the connecting portion is arranged is different for different gear stages. Similarly, gear ratio is different for different gear stages. As a result, the frictional resistance in the axial direction, for example, between the connecting portion and the idler gear and between the connecting portion and the component at which the connecting portion is arranged is different for different gear stages. Calculating the reference torque Ter1 appropriate for each gear stage based on the learned torque Tr corresponding to the presently established gear stage reliably restrains the connecting portion from being unable to disengage from the idler gear due to a discrepancy of the frictional resistance in the axial direction for each gear stage, for example, between the connecting portion and the idler gear and between the connecting portion and the component at which the connecting portion is arranged.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle drive system comprising:
a transmission including
an input shaft receiving an engine torque,
an output shaft arranged in parallel with the input shaft, the output shaft configured to rotatably connect to a driving wheel,
plural idler gears idly rotatably arranged at one of the input shaft and the output shaft,
plural fixed gears fixed to the other of the input shaft and the output shaft so as not to relatively rotate, the plural fixed gears being engageable with the plural idler gears, respectively,
a connecting portion provided at a first shaft, from among the input shaft and the output shaft, at which the plural idler gears are arranged, and positioned side by side with the plural idler gears so as not to rotate relative to the first shaft and so as to move in an axial direction of the first shaft, the connecting portion for rotatably connecting a first idler gear from among the plural idler gears and the first shaft so as to restrain the first idler gear and the first shaft from rotating relative to each other, and
a shift actuator moving the connecting portion in the axial direction to engage the connecting portion with the first idler gear so as not to relatively rotate, the shift actuator moving the connecting portion in the axial direction to be disengaged from the first idler gear so as to relatively rotate;
a clutch configured to be arranged between a drive shaft receiving the engine torque and the input shaft, the clutch selectively connecting the drive shaft and the input shaft; and
a shift execution portion operating the shift actuator to control the connecting portion in an engaged state engaged with the idler gear of a present gear stage to disengage from the idler gear of the present gear stage while decreasing the engine torque at a substantially constant first rate while the clutch is still engaged, across a first period between a first time when a shift operation from the present gear stage to a subsequent gear stage is executed and a second time when a driving of the shift actuator in a direction toward a neutral position at which the connecting portion is disengaged from the plurality of idler gears is started,
wherein the shift execution portion, after decreasing the engine torque to a reference torque during the first period, at the second time operates the shift actuator to control the connecting portion in the engaged state engaged with the idler gear of the present gear stage to disengage from the idler gear of the present gear stage by operating the shift actuator while decreasing the engine torque at a substantially constant second rate across a second period between the second time and a third time at which the shift actuator is brought into a neutral position, and
wherein the shift execution portion memorizes the engine torque at a time when movement of the connecting portion is detected as a learned torque and calculates the reference torque based on the learned torque when disengaging the connecting portion in the engaged state engaged with the idler gear of the present gear stage to disengage from the idler gear of the present gear stage.

2. The vehicle drive system according to claim 1, wherein the shift execution portion calculates the reference torque by adding an adjustment torque to the learned torque.

3. The vehicle drive system according to claim 1, wherein the shift execution portion memorizes the learned torque and a gear stage at a time when movement of the connecting portion is detected and calculates the reference torque based on the learned torque corresponding to the presently established gear stage when disengaging the connecting portion in an engaged state engaged with the idler gear of the present gear stage from the idler gear of the present gear stage.

4. The vehicle drive system according to claim 1, wherein the shift execution portion disengages the clutch after the connecting portion is disengaged from the idler gear of the present gear stage, operates the shift actuator to control the connecting portion for engaging with the idler gear of the subsequent gear stage to engage with the idler gear of the subsequent gear stage to rotatably connect the idler gear of the subsequent gear stage to the shaft at which the idler gear of the subsequent gear stage is arranged, and then engages the clutch.

5. The vehicle drive system according to claim 1, wherein the shift execution portion starts executing a neutral processing to drive the shift actuator so that the connecting portion starts moving in the neutral direction when the engine torque is greater than the reference torque on executing the shift operation.

6. The vehicle drive system according to claim 5, wherein the shift execution portion calculates the reference torque and executes an engine control in the neutral processing until the engine torque becomes the reference torque.

7. The vehicle drive system according to claim 6, wherein the shift execution portion starts a control for driving the shift actuator toward the neutral direction when the engine torque becomes the reference torque and memorizes a gear stage and a learned torque at a time when an operation of the shift actuator is started where the learned torque is the engine torque at the time when the operation of the shift actuator is started.

* * * * *